(12) United States Patent
Ko et al.

(10) Patent No.: US 8,793,739 B2
(45) Date of Patent: Jul. 29, 2014

(54) MOBILE TERMINAL AND RELATED CONTENT PROVIDING METHOD USING BROADCAST SERVICE GUIDE INFORMATION THEREOF

(75) Inventors: Young-Seok Ko, Seoul (KR); Soo-Lim You, Gyeonggi-Do (KR); Seok-Min Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 12/906,932

(22) Filed: Oct. 18, 2010

(65) Prior Publication Data

US 2011/0252445 A1  Oct. 13, 2011

(30) Foreign Application Priority Data

Apr. 12, 2010 (KR) ........................ 10-2010-0033505

(51) Int. Cl.
| | |
|---|---|
| *H04N 5/445* | (2011.01) |
| *H04N 7/16* | (2011.01) |
| *G06F 3/00* | (2006.01) |
| *G06F 13/00* | (2006.01) |
| *H04N 21/482* | (2011.01) |
| *H04N 21/84* | (2011.01) |

(52) U.S. Cl.
CPC ......... *H04N 21/482* (2013.01); *H04N 21/4828* (2013.01); *H04N 21/84* (2013.01)
USPC .................. 725/53; 725/37; 725/43; 725/49; 725/62

(58) Field of Classification Search
CPC .. H04N 21/84; H04N 21/482; H04N 21/4828
See application file for complete search history.

(56) References Cited

U.S. PATENT DOCUMENTS

| | | | |
|---|---|---|---|
| 7,293,275 B1* | 11/2007 | Krieger et al. ............... 725/40 |
| 2004/0148555 A1* | 7/2004 | Blackburn et al. .......... 714/747 |
| 2005/0022236 A1 | 1/2005 | Ito et al. |
| 2006/0010472 A1* | 1/2006 | Godeny ....................... 725/62 |
| 2008/0201738 A1* | 8/2008 | Song et al. .................. 725/39 |
| 2010/0100899 A1* | 4/2010 | Bradbury et al. ............ 725/29 |

FOREIGN PATENT DOCUMENTS

| | | |
|---|---|---|
| EP | 1744556 | 1/2007 |
| EP | 1850585 | 10/2007 |
| EP | 1909498 | 4/2008 |
| JP | 2008227947 | 9/2008 |

\* cited by examiner

*Primary Examiner* — Nathan Flynn
*Assistant Examiner* — James R Marandi
(74) *Attorney, Agent, or Firm* — Lee, Hong, Degerman, Kang & Waimey

(57) ABSTRACT

A related content providing method using broadcast service guide information of a mobile terminal is disclosed. The method includes playing broadcast content stored in the mobile terminal, searching for real-time broadcast content related to the played broadcast content while displaying the played broadcast content, and displaying information associated with the searched real-time broadcast content.

34 Claims, 31 Drawing Sheets

MOBILE TERMINAL AND RELATED CONTENT PROVIDING METHOD USING BROADCAST SERVICE GUIDE INFORMATION THEREOF

CROSS REFERENCE TO RELATED AN APPLICATION

Pursuant to 35 U.S.C. §119(a), this application claims the benefit of earlier filing date and right of priority to Korean Application No. 10-2010-0033505, filed on Apr. 12, 2010, the content of which is incorporated by reference herein in its entirety.

FIELD OF THE INVENTION

The present invention relates to a mobile terminal and a method for utilizing broadcast service guide information. More specifically, a mobile terminal capable of storing broadcast data and corresponding broadcast service guide information when capturing or video-recording broadcast data, and capable of searching and providing broadcast data relating to the stored broadcast data when playing the stored broadcast data, and a related content providing method using broadcast service guide information thereof.

DESCRIPTION OF THE RELATED ART

As terminals, such as personal computers, notebooks, mobile phones and the like, become multifunctional, the terminals can be allowed to capture still images or moving images, play music or video files, play games, receive broadcast and the like, so as to be implemented as an integrated multimedia player.

In general, terminals may be categorized as a mobile terminal and a stationary terminal according to each mobility. The mobile terminal may then be categorized into a handheld terminal and a vehicle mounted terminal according to whether a user can carry the terminal during use.

As wireless communications and broadcast techniques are combined, services which allow a user to conveniently view digital broadcast are provided. This digital broadcast service may be categorized into a terrestrial broadcast service and a satellite broadcast service according to a transmission method and a network configuration.

A terminal which supports a digital broadcast service receives a service guide such as an electronic service guide (ESG) provided from a broadcast center, stores the received service guide in a memory, and then provides the service guide to a user. Specifically, the user may select a desired item or service via information included in the service guide stored in the terminal.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment a related content providing method using broadcast service guide information of a mobile terminal. The method includes playing broadcast content stored in the mobile terminal, searching for real-time broadcast content related to the played broadcast content while displaying the played broadcast content, and displaying information associated with the searched real-time broadcast content.

According to one feature, the broadcast service guide information is stored with the broadcast content or is stored in the form of link information. Additionally, the broadcast service guide information comprises a broadcast time information, a service ID, a service name, a service number, a service description, a service type, channel information, a keyword, a theme, a genre, a synopsis, a content (program) ID, a content start time, and a content end time. Furthermore, searching for real-time broadcast content comprises searching for broadcast service guide information of the real-time broadcast content comprising at least one matched element with broadcast service guide information of the broadcast content being currently played.

According to another feature, the broadcast service guide information is provided via a request to a broadcast center or is pre-stored in the mobile terminal. Additionally, the real-time broadcast content found via the search is played when playback of the broadcast content being currently played has been completed.

According to yet another feature, displaying information about the searched real-time broadcast content comprises stopping playback of the broadcast content being currently played and playing the searched real-time broadcast content, and playing the stopped broadcast content when playback of the searched real-time broadcast content has been completed.

According to still yet another feature, displaying information about the searched real-time broadcast content comprises determining if the searched real-time broadcast content is viewable, receiving the searched real-time broadcast content if the searched broadcast content is viewable, and playing and displaying the received real-time broadcast content. Furthermore, determining if the searched real-time broadcast content is viewable comprises determining if the current time corresponds to a time between a broadcast start time and a broadcast end time of the searched real-time broadcast content. Finally, performing a viewing reservation or a video-recording reservation with respect to the searched real-time broadcast content if the searched real-time broadcast content is not viewable.

In accordance with another embodiment, a mobile terminal is presented, the mobile terminal includes a broadcast receiving module configured to receive broadcast data and broadcast service guide information, a memory configured to store broadcast content comprising the received broadcast data and the broadcast service guide information, a controller configured to search real-time broadcast content relating to a broadcast content being currently played according to broadcast service guide information of the broadcast content being currently played, and configured to process the searched broadcast content, and a display unit configured to display the broadcast content being currently played.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a view showing broadcast service guide information in accordance with an embodiment of the present invention.

DETAILED DESCRIPTION OF PREFERRED EMBODIMENTS

Description will now be given in detail of the present invention, with reference to the accompanying drawings.

For the sake of brief description with reference to the drawings, the same or equivalent components will be provided with the same reference numbers, and description thereof will not be repeated.

Hereinafter, a mobile terminal according to the present invention will be explained in more detail with reference to the attached drawings. The suffixes attached to components of the mobile terminal, such as 'module' and 'unit' or 'portion' are used for facilitation of the detailed description of the present invention. Therefore, the suffixes do not have different meanings from each other.

Mobile terminals described in the present invention may include mobile phones, smart phones, laptop computers, digital broadcasting terminals, personal digital assistants (PDAs), portable multimedia players (PMPs), navigators, and the like. However, it can be easily understood by those skilled in the art that the configuration in accordance with the preferred embodiments of the present invention may be applicable to stationary terminals, such as digital TVs, desktop computers and the like, excluding a case of being applicable only to the mobile terminals.

Figure 1:
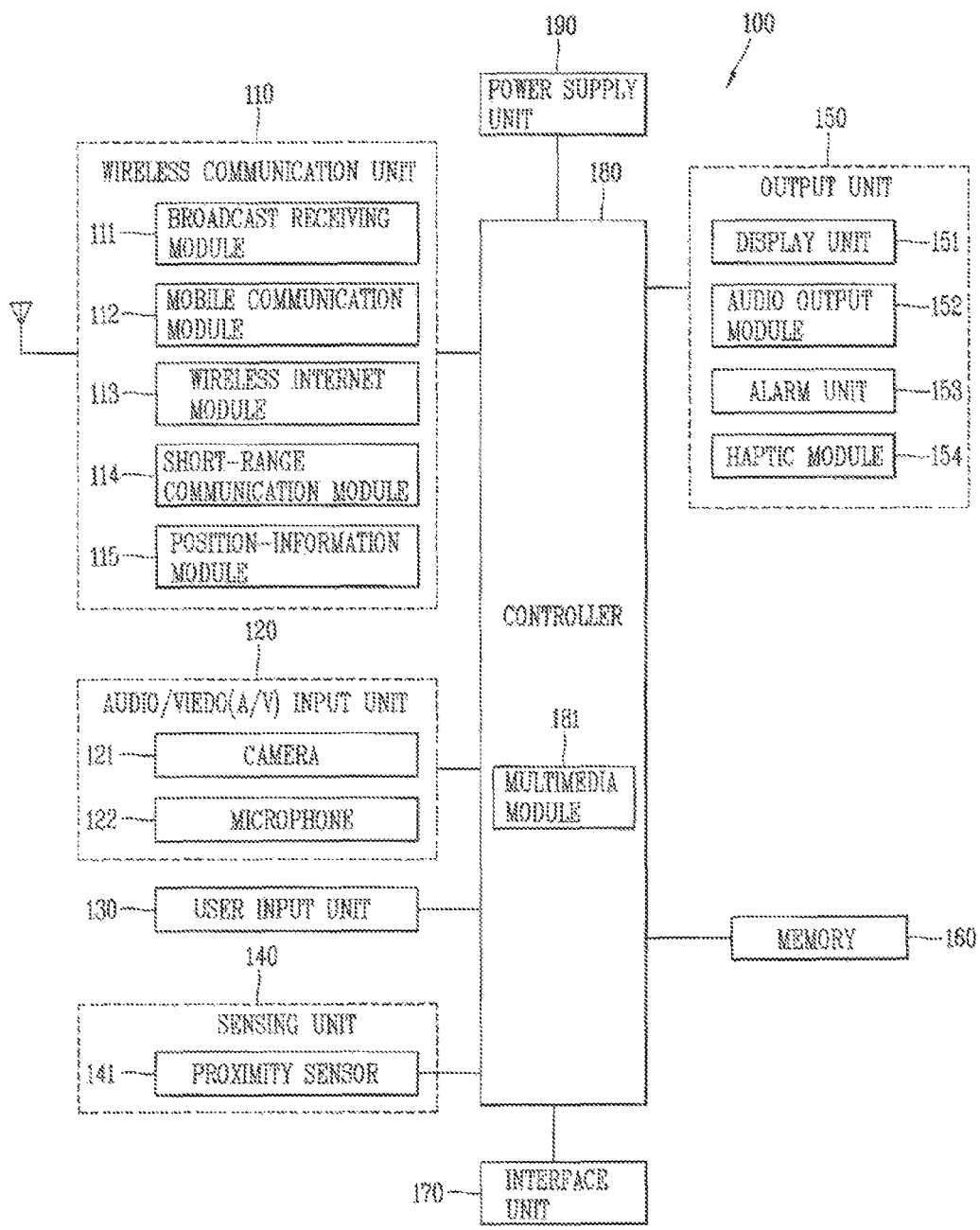
FIG. 1 is a block diagram of a mobile terminal in accordance with one embodiment of the present invention.

FIG. 1 is a block diagram of a mobile terminal in accordance with one embodiment of the present invention.

The mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a position information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For example, broadcast associated information may include an Electronic Program Guide (EPG) of a Digital Multimedia Broadcasting (DMB), an Electronic Service Guide (ESG) of a Digital Video Broadcast-Handheld (DVB-H) system, and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external terminal, a server, etc.) on a mobile communication network. Here, the wireless signals may include an audio call signal, a video call signal, or various formats of data according to a transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for detecting or calculating a position of a mobile terminal. An example of the position information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the use environment of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For example, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device and the like. Moreover, the sensing unit 140 may include a proximity sensor 141.

The output unit 150 is configured to output an audio signal, a video signal or an alarm signal. The output unit 150 may include a display 151, an audio output module 152, an alarm 153, a haptic module 154 and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal is in a video call mode or a capturing mode, the display 151 may additionally or alternatively display images captured and/or received, the UI, or the GUI.

The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays can be configured to be transparent. These displays may be called transparent displays. A representative example of the transparent display may include a Transparent Organic Light Emitting Diode (TOLED), and the like. The rear surface of the display 151 may also be implemented to be optically transparent. Under this configuration, a user can view an object positioned at a rear side of a terminal body via a region occupied by the display 151 of the terminal body.

The display 151 may be implemented as two or more in number according to a configured aspect of the mobile terminal 100. For example, a plurality of the displays 151 may be arranged on one surface to be spaced apart from or integrated with each other, or may be arranged on different surfaces.

Here, if the display 151 and a touch sensitive sensor (referred to as a 'touch sensor') have a layered structure there between, the structure may be referred to as 'touch screen'. In this structure, the display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display 151 has been touched.

As shown in FIG. 1, a proximity sensor 141 may be arranged at an inner region of the mobile terminal 100 covered by the touch screen, or near the touch screen. The proximity sensor 141 indicates a sensor to sense a presence or absence of an object approaching a surface to be sensed, or an object disposed near a surface to be sensed, by using an electromagnetic field or infrared rays without mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and so on. When the touch screen is implemented as a capacitance type, proximity of a pointer to the touch screen is sensed by changes of an electromagnetic field. In this case, the touch screen (touch sensor) may be categorized as a proximity sensor.

Hereinafter, for the sake of brief explanation, a pointer positioned proximate to the touch screen without contact will be referred to as 'proximity touch', whereas a pointer substantially contacting the touch screen will be referred to as 'contact touch'. A position corresponding to the proximity touch of the pointer on the touch screen, corresponds to a position where the pointer faces perpendicular to the touch screen upon the proximity touch being performed.

The proximity sensor 141 senses a proximity touch, and proximity touch patterns (e.g., distance, direction, speed, time, position, moving status, etc.). Information relating to the sensed proximity touch and the sensed proximity touch patterns may be output to the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., a sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include a call received, message received, key signal input, touch input, and so on. The alarm 153 may output not only video or audio signals, but also other types of signals such as signals notifying occurrence of events via vibration of the mobile terminal 100. Since the video or audio signals can be output via the display 151 or the audio output unit 152, the display 151 and the audio output module 152 may be categorized as part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For example, different vibrations may be output in a synthesized manner or in a sequential manner.

The haptic module 154 may generate various haptic effects, including not only vibration, but also an arrangement of pins vertically moving with respect to a skin being touched (contacted), an air injection force or air suction force via an injection hole or a suction hole, a touch by a skin surface, a presence or absence of contact with an electrode, effects by stimulus such as an electrostatic force, reproduction of a cold or hot feeling using a heat absorbing device or a heat emitting device, and the like.

The haptic module 154 may be configured to transmit tactile effects (signals) via a user's direct contact, or a user's muscular sense using a finger or a hand. The haptic module 154 may be implemented as two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 stores a phone book (phone directory) including information about one or more call parties. The information about call parties may include names, phone numbers, homepage addresses, community site information, anniversaries, addresses, etc. The community site information may include addresses of community sites being currently used by the call parties, IDs, passwords, etc.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow data reception from an external device, power delivery to each component in the mobile terminal 100, or data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device')

may be implemented as a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle, or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephone calls, data communication, video calls, and the like. The controller 180 may include a multimedia module 181 which provides multimedia playback. The multimedia module 181 may be configured as part of the controller 180 or as a separate component.

The controller 180 can perform pattern recognition processing so as to recognize writing or drawing input on the touch screen as text or image.

The power supply unit 190 provides power required by various components under the control of the controller 180. The provided power may be internal power, external power, or a combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2A:
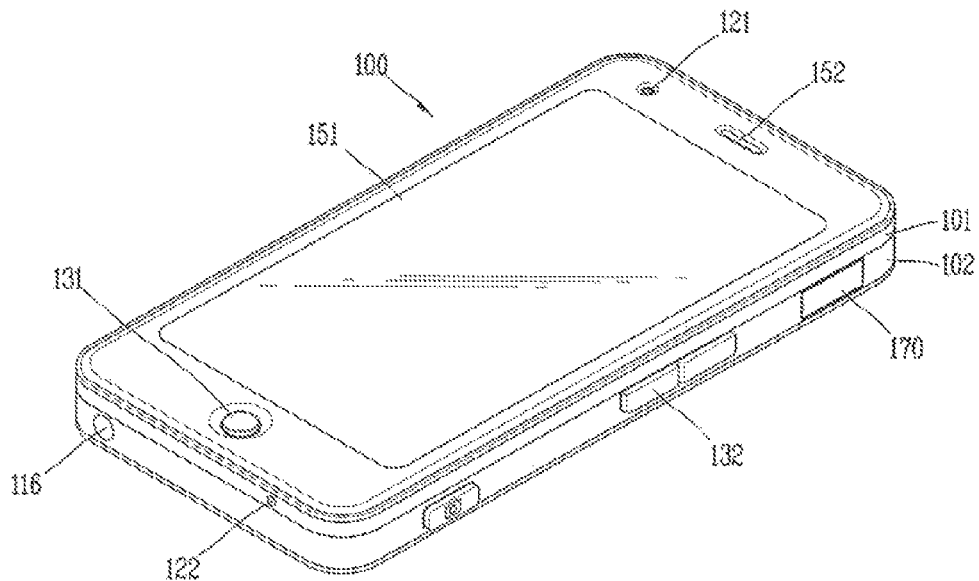
FIG. 2A is a front perspective view of the mobile terminal in accordance with the one embodiment of the present invention.

FIG. 2A is a front perspective views of the mobile terminal in accordance with one embodiment of the present invention.

The mobile terminal 100 described is a bar type body. However, the present invention is not limited to the type, but applicable to various configurations having two or more bodies coupled to each other to be relatively movable, such as a slide type, a folder type, a swing type, a swivel type and the like.

A case (casing, housing, cover, etc.) forms an outer appearance of a terminal body. In this embodiment, the case may include a front case 101 and a rear case 102. A space formed by the front case 101 and the rear case 102 may accommodate various components therein. At least one intermediate case may further be disposed between the front case 101 and the rear case 102.

Such cases may be formed of injection-molded synthetic resin, or may be formed using a metallic material such as stainless steel (STS) or titanium (Ti).

The terminal body, in detail, the front case 101 is shown having a display 151, an audio output module 152, a camera 121, a user input unit 130 (e.g., 131, 132), a microphone 122, an interface unit 170 and the like.

The display 151 may occupy most of a main surface of the front case 101. The audio output module 152 and the camera 121 are disposed at a region adjacent to one of both end portions of the display 151, and the user input unit 131 and the microphone 122 are disposed at a region adjacent to another end portion thereof. The user input unit 132, the interface unit 170 and the like may be disposed at side surfaces of the front case 101 and the rear case 102.

The user input unit 130 may be manipulated to receive a command input for controlling the operation of the mobile terminal 100, and include the first and second manipulation units 131 and 132. The first and second manipulation units 131 and 132 may be referred to as a manipulating portion. The manipulating portion may be operated by a user in any tactile manner.

Content input by the first and second manipulation units 131 and 132 may variously be set. For example, the first manipulation unit 131 may be configured to input commands such as START, END, SCROLL or the like, and the second manipulation unit 132 may be configured to input a command, such as adjusting an audio sound, a conversion of the display 151 into a touch-sensitive mode or the like.

Figure 2B:
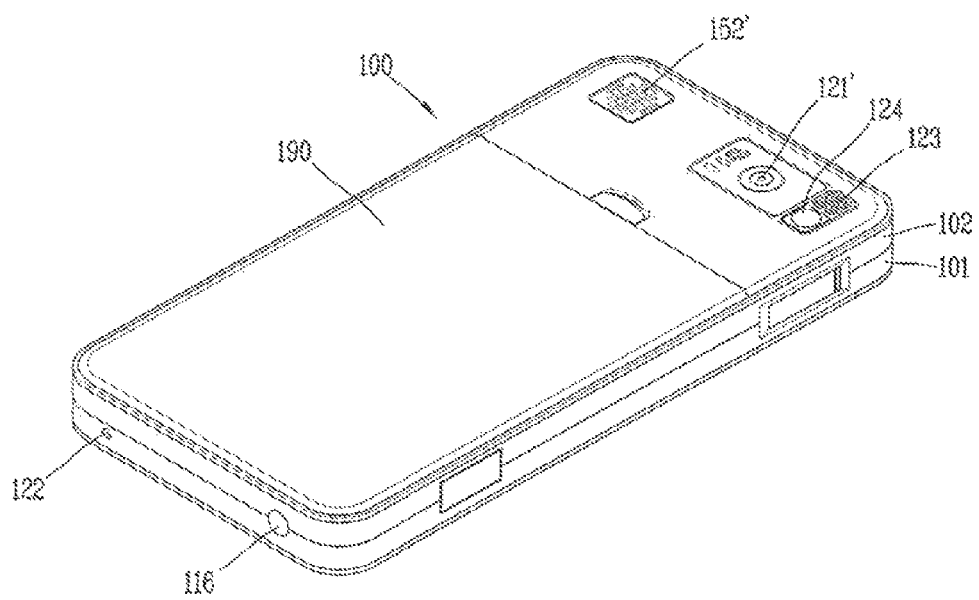
FIG. 2B is a rear perspective view of the mobile terminal in accordance with an embodiment of the present invention.

FIG. 2B is a rear perspective view of the mobile terminal shown in FIG. 2A.

As shown in FIG. 2B, a rear surface of the terminal body, namely, the rear case 102 may further be provided with a camera 121'. The camera 121' faces a direction which is opposite to a direction faced by the camera 121, and may have a different pixel resolution from that of the camera 121.

For example, the camera 121 may operate with relatively lower pixels (lower resolution). Thus, the camera 121 may be useful when a user can capture his face and send it to another party during a video call or the like. On the other hand, the camera 121' may operate with relatively higher pixels (higher resolution) such that it can be useful for a user to obtain higher quality pictures for later use. Such cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear surface of the terminal body. The audio output module 152' can cooperate with the audio output module 152 (see FIG. 2A) to provide stereo output. Also, the audio output module 152' may be configured to operate as a speakerphone.

A broadcast signal receiving antenna 116 may further be disposed at the side surface of the terminal body in addition to an antenna for communications. The antenna 116 configuring a part of the broadcast receiving module 111 (see FIG. 1) may be retractable into the terminal body.

A power supply unit 190 for supplying power to the mobile terminal 100 may be mounted to the terminal body. The power supply 190 may be internally disposed at the terminal body, or be detachably disposed outside the terminal body.

A touch pad for detecting a touch input may further be disposed at the rear case 102. The touch pad may also be configured to be transparent, as similar to the display 151. In this case, if the display 151 is configured to output visible information on both of its surfaces, such visible information can be identified via the touch pad. Information output on both surfaces may all be controlled by the touch pad. In a different manner, a display may further be mounted on the touch pad so as to dispose a touch screen at the rear case 102.

The touch pad operates in cooperation with the display 151 of the front case 101. The touch pad may be disposed at the rear side of the display 151 in parallel. Such touch pad may be the same as or smaller than the display 151.

Figure 3:
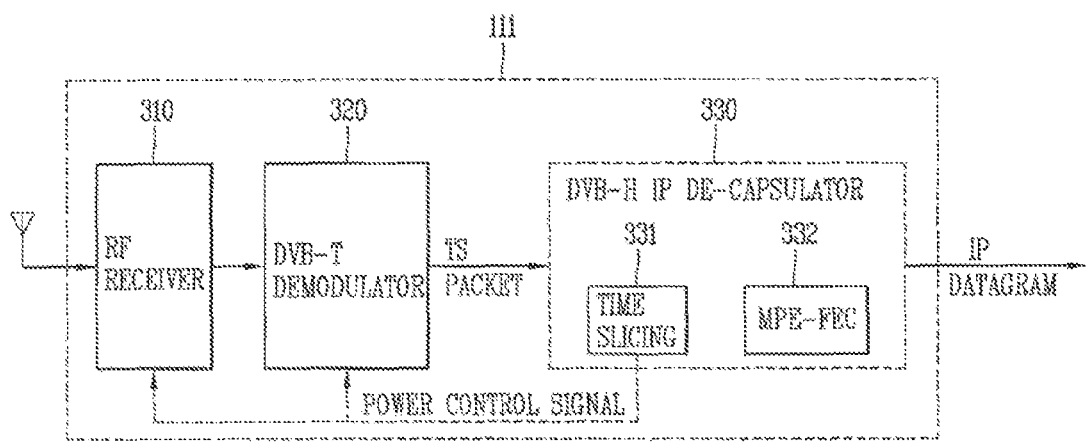
FIG. 3 is a block diagram of a broadcast receiving module of the mobile terminal of FIG. 1.

FIG. 3 is a block diagram of a broadcast receiving module of the mobile terminal of FIG. 1. A Digital Video Broadcast Handheld (DVB-H) system-based broadcast receiving module will be explained.

Referring to FIG. 3, the broadcast receiving module 111 includes a radio frequency (RF) receiver 310, a Digital Video Broadcast Terrestrial (DVB-T) demodulator, hereinafter referred to as demodulator 320, and an Internet Protocol (IP) decapsulator 330.

The RF receiver 310 sets a physical channel frequency for transmitting a broadcast channel selected by a user, and receives a broadcast signal of a broadcast channel which is broadcast via the set physical channel. Specifically, the RF receiver 310 receives broadcast data transmitted from a broadcast center via an antenna and outputs the received broadcast data to the demodulator 320.

The demodulator 320 demodulates an MPEG-2 transport steam (TS) packet from a broadcast signal received via the RF receiver 310. The demodulator 320 demodulates broadcast data based on a Transmission Parameter Signal (TPS) according to transmission modes 8K, 4K and 2K provided from the broadcast center together with broadcast data. The TPS includes information such as, Time-Slicing, Multi-Protocol Encapsulated Forward Error Correction (MPE-FEC), or whether a 4K mode has been used.

If the received broadcast data has undergone an MPE-FEC process, the demodulator 320 outputs the received broadcast data to an MPE-FEC module 332. On the other hand, if the received broadcast data has not undergone an MPE-FEC process, the demodulator 320 outputs the received broadcast data to the controller 180. Additionally, the demodulator 320 provides the information about Time-Slicing, included in the TPS, to a slicing module 331.

The IP decapsulator 330 includes a time slicing module 331 which performs time slicing according to the TPS, and an MPE-FEC module 332 which performs MPE-FEC decoding when the received broadcast data has undergone MPE-FEC coding.

In order to receive a TS packet via the RF receiver 310, the time slicing module 331 controls the power of the RF receiver 310 and the demodulator 320, based on a start time of a next burst duration included in a header of each MPE section and MPE-FEC section. More specifically, the time slicing module 331 operates the RF receiver 310 and the demodulator 320 only in a burst duration which activates time, thereby receiving broadcast data. On the other hand, the time slicing module 331 does not operate the RF receiver 310 and the demodulator 320 in an Off-Time duration. This time slicing technique may minimize battery consumption by reducing power consumption of the broadcast receiving module 111 and allowing broadcast data to be received only in a burst duration. Specifically, the broadcast receiving module 111 selects one of broadcast services time division-multiplexed in the order of time, and receives only bursts corresponding to the selected broadcast service, thereby reducing power consumption.

If the received broadcast data has been MPE-FEC encoded, the MPE-FEC module 332 performs MPE-FEC decoding. Specifically, the MPE-FEC module 332 performs a Packet Identification (PID) filtering process with respect to a TS packet, thereby identifying header information of the TS packet. If the packet ID indicates a packet which transmits an MPE section or an MPE-FEC section as a result of the identification, then an MPE section or an MPE-FEC section is considered to have been received. On the other hand, if the packet ID does not indicate a packet which transmits an MPE section or an MPE-FEC section as a result of the identification, specific program information and service information are received from the TS packet, thereby receiving broadcast reception-related service information such as time slicing and information indicating whether an MPE-FEC has been used. The MPE-FEC is a technique used to enhance a signal to noise (C/N), a Doppler frequency shift, and an endurance against impulse interference.

After the MPE-FEC decoding, the MPE-FEC module 332 outputs an IP datagram to the controller 180. The controller 180 transmits, to the multimedia module 181, the broadcast data decoded by the demodulator 320 and the DVB-H IP decapsulator 330. The multimedia module 181 performs audio/video (A/V) decoding with respect to the decoded broadcast data, and outputs the broadcast data to the display 151. Specifically, the multimedia module 181 reproduces the broadcast data received via the broadcast receiving module 111, and displays the reproduced broadcast data on the display 151.

In the embodiment described above, the DVB-T demodulator 320 and the DVB-H IP decapsulator 330 are referred to as a DVB-H demodulator.

Figure 4:
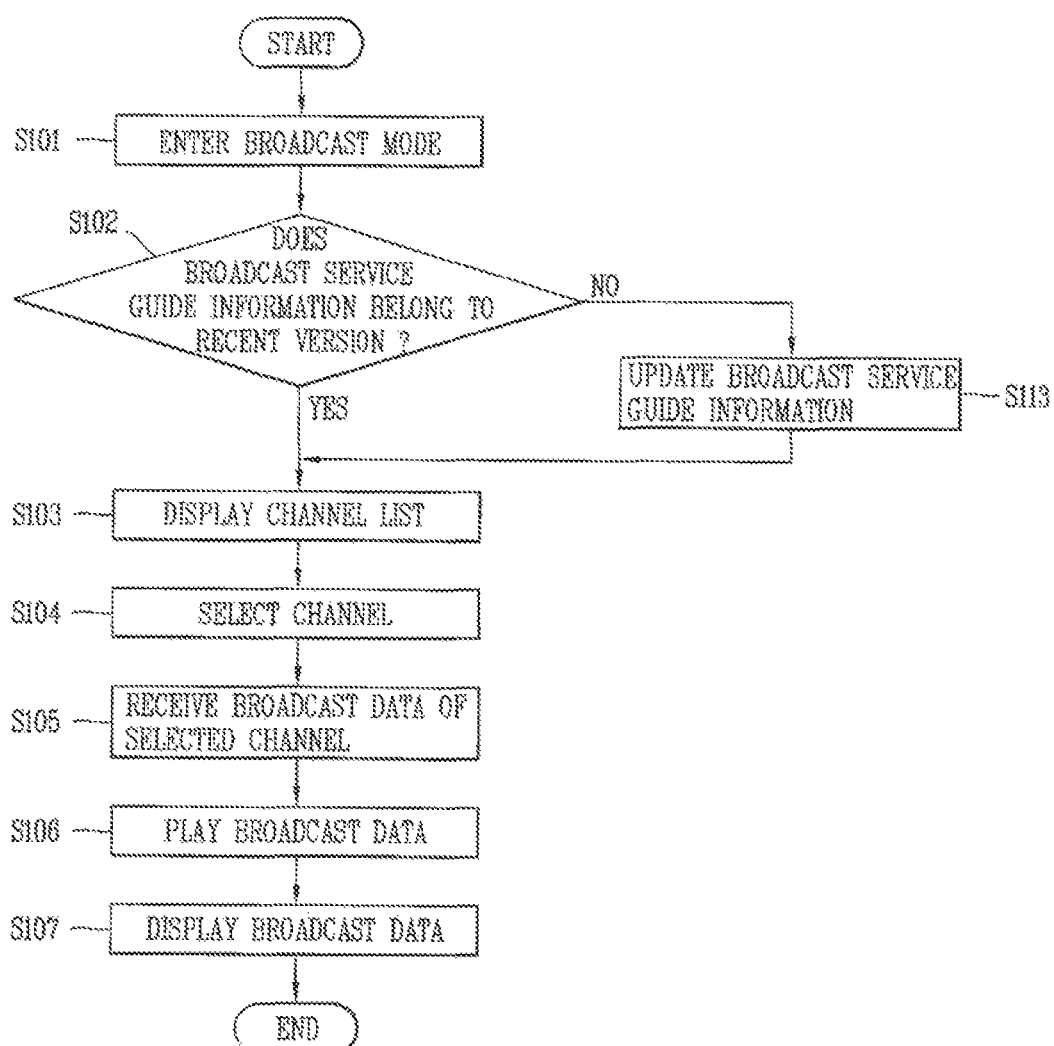
FIG. 4 is a flowchart showing a broadcast data playing method of a mobile terminal in accordance with an embodiment of the present invention.

FIG. 4 is a flowchart showing a broadcast data playing method of a mobile terminal according to an embodiment of the present invention.

The controller 180 of the mobile terminal 100 enters a broadcast mode (S101) if a broadcast menu is selected by a user. The controller 180 operates the broadcast receiving module 111 when entering a broadcast mode. The controller 180 may immediately enter a broadcast mode when a shortcut key, having a broadcast function allocated thereto, is input.

The controller 180 determines the version of the broadcast service guide information, such as an EPG, for the current real-time broadcast (S102). When entering a broadcast mode, the controller 180 determines whether the broadcast service guide information exists in the memory 160. If the broadcast service guide information exists in the memory 160, the controller 180 checks a version of the broadcast service guide information. For example, the controller 180 checks whether the broadcast service guide information has expired. Additionally, if the broadcast service guide information does not exist in the memory 160, the controller 180 receives broadcast service guide information provided from the broadcast center via the broadcast receiving module 111 and stores the received broadcast service guide information in the memory 160. Specifically, when entering a broadcast mode, the controller 180 searches available channels.

Figure 5:
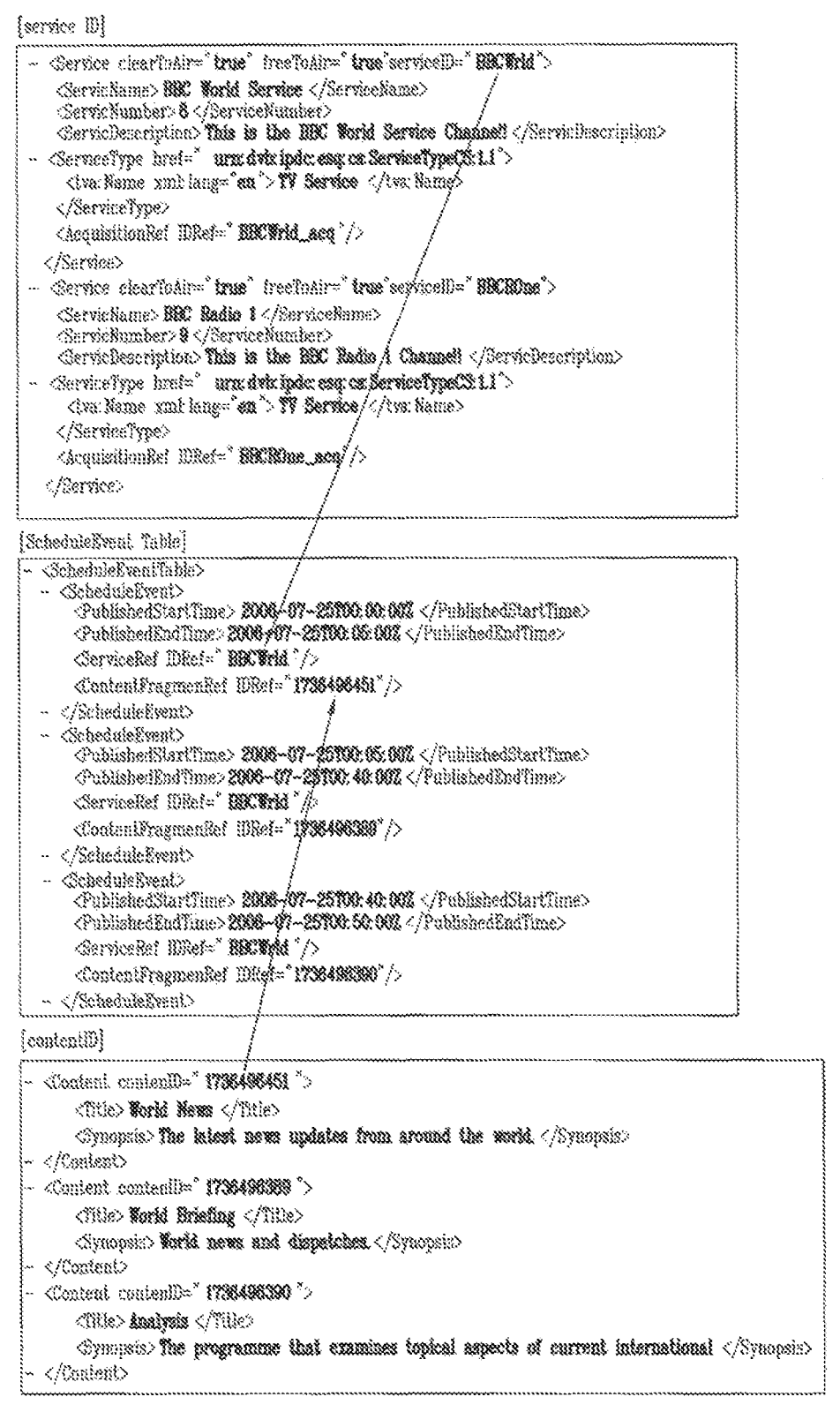
Figure 6:
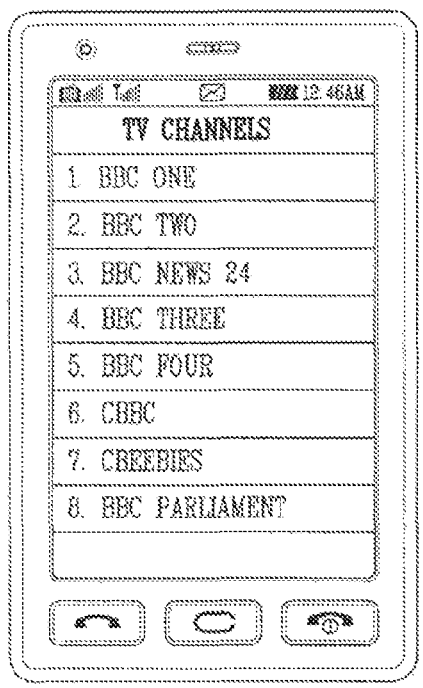
FIG. 6 is a view of a broadcast program guide screen of a mobile terminal in accordance with an embodiment of the present invention.
Figure 6:
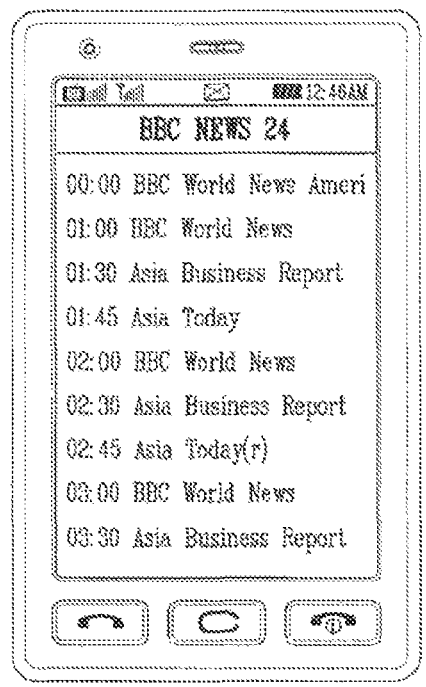
Figure 6:
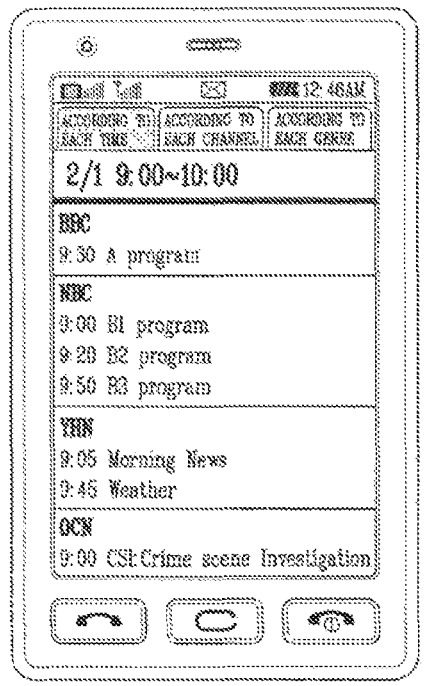

The broadcast service guide information is information relating to use of a broadcast service, and includes a schedule event fragment having a service identification (ID), a service name, a service number, a service description, a service type, channel information, a keyword, a theme, a genre, a main story, a content ID, a content start time, and a content end time. Furthermore, the broadcast service guide information comprises information for connecting a mobile terminal to an IP stream relating to a broadcast transmission stream. The broadcast service guide information is EPG data, and an XML (eXtensible Markup Language) file. FIG. 5 shows EPG data of a service ID, a schedule table, and a content ID as an XML code. The mobile terminal 100 creates a channel list (FIG. 6A) by using a service ID, and creates a program list (FIG. 6B) by using a content ID. Alternatively, the mobile terminal 100 may create a broadcast schedule (FIG. 6C) by using a service ID, a content ID, and a schedule table.

The controller 180 displays the channel list based on the broadcast service guide information stored in the memory 160 (S103) if the broadcast service guide information belongs to a recent version. The controller 180 creates the channel list by using service ID information included in the broadcast service guide information.

Alternatively, if the broadcast service guide information does not belong to a recent version, the controller 180 receives broadcast service guide information of a recent version from the broadcast center via the broadcast receiving module 111, thereby updating the broadcast service guide information (S113). A service channel list is displayed based on the updated broadcast service guide information (S103) once the broadcast service guide information has been updated. Here, the controller 180 aligns the service channel list by using service ID information included in the broadcast service guide information.

The controller 180 receives broadcast data of the selected service channel via the broadcast receiving module 111 (S104, 5105) if a service channel is selected from the displayed channel list. Additionally, the controller 180 reproduces the received broadcast data, such that the received broadcast data is displayed on the display (S106, S107).

In the embodiment disclosed above, when the mobile terminal 100 enters a broadcast mode, a version of broadcast service guide information is checked to update the broadcast service guide information. However, the broadcast service guide information may also be updated in response to a user request.

Figure 7:
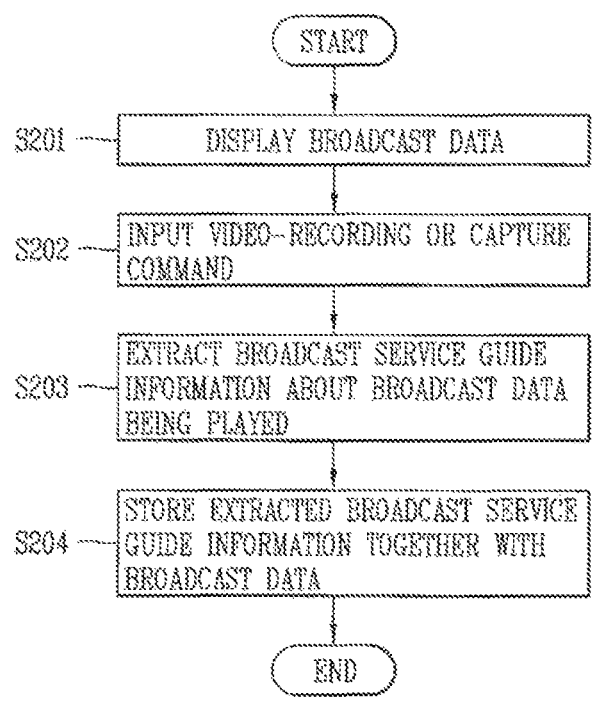
FIG. 7 is a flowchart showing a broadcast data storing method by a mobile terminal according to an embodiment of the present invention.

FIG. 7 is a flowchart showing a broadcast data storing method by a mobile terminal according to one embodiment of the present invention.

Referring to FIG. 7, the controller 180 receives broadcast data via the broadcast receiving module 111 according to a user's input, and produces the received broadcast data to be displayed on the screen (S201).

If a video-recording command or a capture command is input via the user input unit 130 while displaying the received broadcast data, the controller 180 temporarily stores the broadcast data being currently displayed on the screen in a buffer (S202). More specifically, if a user inputs a video-recording command or a capture command while viewing digital broadcast, the controller 180 video-records or captures the digital broadcast currently displayed according to the command. For example, if a video-recording command is input, the controller 180 starts to store, in the buffer, broadcast data received via the broadcast receiving module 111 from the time point when the video-recording command has been input. On the other hand, if a capture command is input, the controller 180 stores, in the buffer, broadcast data currently displayed on the screen at the time point when the capture command has been input. The capture command is similar to taking a snapshot of the image displayed on the screen.

The controller 180 extracts, from the pre-stored broadcast service guide information, broadcast service guide information associated with the broadcast data being displayed on the screen (S203). More specifically, if a video-recording command or a capture command is received from the user input unit 130, the controller 180 stores the broadcast data, and extracts, from the pre-stored broadcast service guide information, broadcast service guide information such as a service identifier (ServiceID), a content identifier (ContentID), and schedule information (ScheduleEventTable) of a broadcast program being current provided. The ServiceID indicates a service channel, the ContentID indicates a broadcast program, and the ScheduleEventTable indicates a star/end time of a broadcast program.

The controller 180 stores the extracted broadcast service guide information in the memory 160 together with the captured or video-recorded broadcast data (S204). The controller 180 may create a content which is a combination of the extracted broadcast service guide information and the captured or video-recorded broadcast data, thereby storing the created one content. Alternatively, the controller 180 may separately store the extracted broadcast service guide information and the captured or video-recorded broadcast data, respectively. For example, if a video-recording command is input while a user is viewing a specific broadcast program, the controller 180 extracts, from the pre-stored broadcast service guide information, broadcast service guide information such as a ServiceID, a ScheduleEventTable and a ContentID, the broadcast service guide information relating to the specific broadcast program. Then, the controller 180 builds a database (DB) by including the extracted broadcast service guide information in the video-recorded broadcast program. The controller 180 builds a DB list about the captured or video-recorded broadcast data stored in the memory 160, and stores the DB list.

When building the DB List, the controller 180 may store flag information indicating whether broadcast content to be stored is a captured broadcast data or video-recorded broadcast data, together with the extracted broadcast service guide information. Alternatively, the controller 180 may store sequence information when storing each broadcast program according to a predetermined time, such as per 20 minutes, in case of video-recording a broadcast program exceeds a predetermined time, such as 1 hour, together with the extracted broadcast service guide information.

The controller 180 searches one or more content relating to the broadcast being video-recorded or captured, from the content pre-stored in the mobile terminal if a search request for content relating to broadcast being video-recorded or captured is received. The controller 180 may store the searched result by linking to the video-recorded or captured broadcast file. Specifically, the controller 180 stores the searched result together with the memory address information for the location in which the searched broadcast file has been stored.

A user may select a captured or video-recorded broadcast content, from the captured and video-recorded broadcast content stored in the memory 160, and view the selected broadcast while viewing the current broadcast or after viewing the current broadcast.

For example, the controller 180 executes a function according to a user's input while viewing the current broadcast or after viewing the current broadcast. The controller 180 may also display a list of content pre-stored in memory. In this example, the controller 180 displays the content pre-stored in the memory by aligning according to a creation date, whether or not the pre-stored content has been played, a play frequency, a play date, or the like.

If a specific content is selected from the displayed list of the pre-stored content, the controller 180 reads the associated broadcast data from the memory 160 and then displays the broadcast data on the screen.

Figure 8:
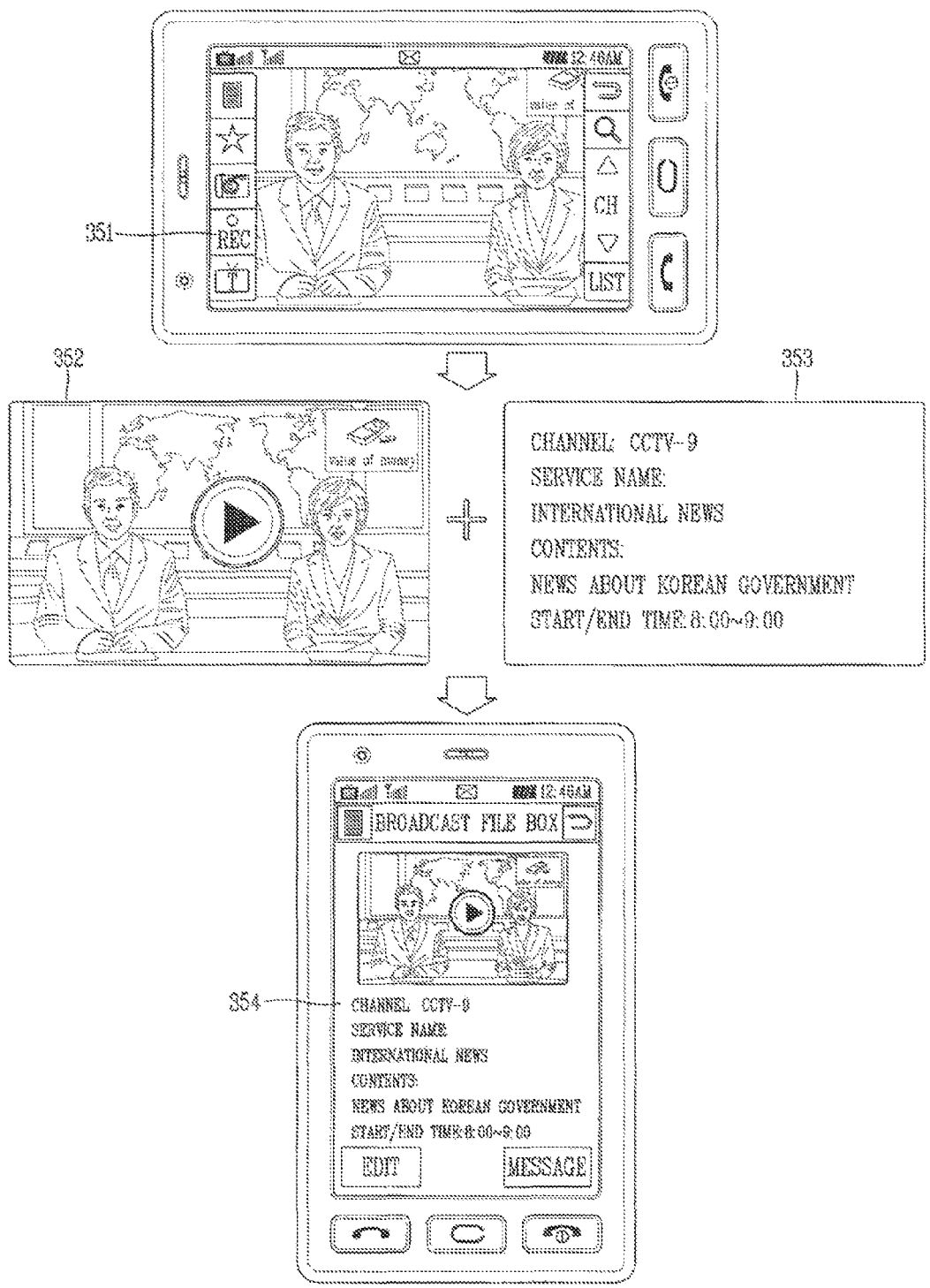
FIG. 8 is a flowchart showing a broadcast data storing process by a mobile terminal according to an embodiment of the present invention.

FIG. 8 is a flowchart showing a broadcast data storing process by the mobile terminal according to one embodiment of the present invention.

First, the mobile terminal 100 receives broadcast data via the broadcast receiving module 111 according to a user's command, and displays the received broadcast data on the screen.

If a video-recording icon 351 is selected while viewing the displayed broadcast, the controller 180 of the mobile terminal starts to video-record the provided broadcast. Specifically, the controller 180 stores the broadcast data received via the broadcast receiving module 111 in the memory 160 until a video-recording end command is received.

Additionally, the controller 180 extracts, from the pre-stored broadcast service guide information, broadcast service guide information associated with the currently video-recorded broadcast data.

If the video-recording has been completed, the controller 180 stores the broadcast content 352 created via the video-recording in the memory, together with the extracted broadcast service guide information 353. If a desired broadcast content is selected from the memory in order to check the stored broadcast content, the controller 180 displays a detailed view 354 of the selected broadcast content. While displaying the detailed view 354, broadcast service guide information about broadcast content may be edited, or broadcast content may be transmitted.

Figure 9:
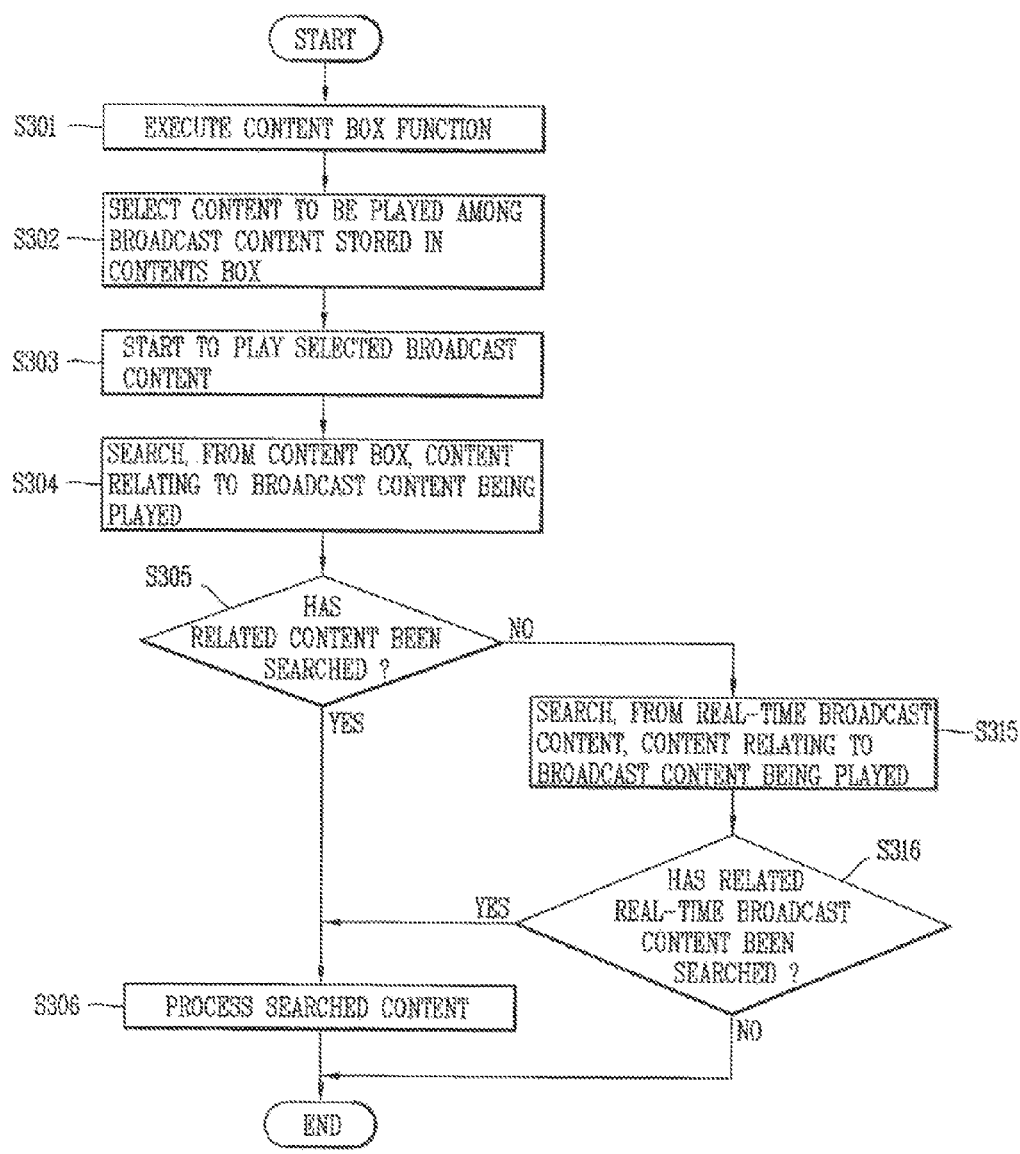
FIG. 9 is a flowchart showing a related content providing method by a mobile terminal according to an embodiment of the present invention.

FIG. 9 is a flowchart showing a related content providing method by the mobile terminal according to one embodiment of the present invention.

Referring to FIG. 9, if a content box function is selected according to a user's input, the controller 180 executes a content box function (S301). The controller 180 displays, on the screen, a list of content pre-stored in the memory 160. The pre-stored content may be broadcast data video-recorded or captured according to the aforementioned broadcast data storing method, or may be content downloaded from a content providing server via the wireless communication unit 110.

The controller 180 starts to play the selected pre-stored content according to the play command (S302, S303) when one of the content displayed in the content box is selected and a play command is input.

The controller 180 starts to play the selected pre-stored content, and searches, from the content pre-stored in the memory 160, content relating to the pre-stored content being currently played (S304). The controller 180 searches the memory 160 for a content associated with a broadcast service guide information which is mapped with the broadcast service guide information of the pre-stored content being currently played. For example, the controller 180 may search the broadcast content stored in the mobile terminal for content including content ID information mapped with a content ID "1010001" of the pre-stored content being currently played. Accordingly, the stored broadcast content which includes a content ID of "1010001" would be considered as being related to the pre-stored content which is currently played.

The controller 180 outputs an alarm signal in order process the searched content (S305, S306) if pre-stored content is related to the content currently played. The alarm signal may include any type of notification such as a notification message, a voice message, or an alarm sound.

The controller 180 searches broadcast service guide information of real-time broadcast content if pre-stored content has not been searched in S305. The controller 180 may search for real-time broadcast content mapped with the broadcast service guide information of the content being currently played (S315). The controller 180 processes the related real-time broadcast content (S316, S306) if related real-time broadcast content is found during the search.

In the embodiment described above, related content is searched while playing a selected pre-stored content. However, the search for related content may be executed after or before a selected pre-stored content has been completely played.

Figure 10:
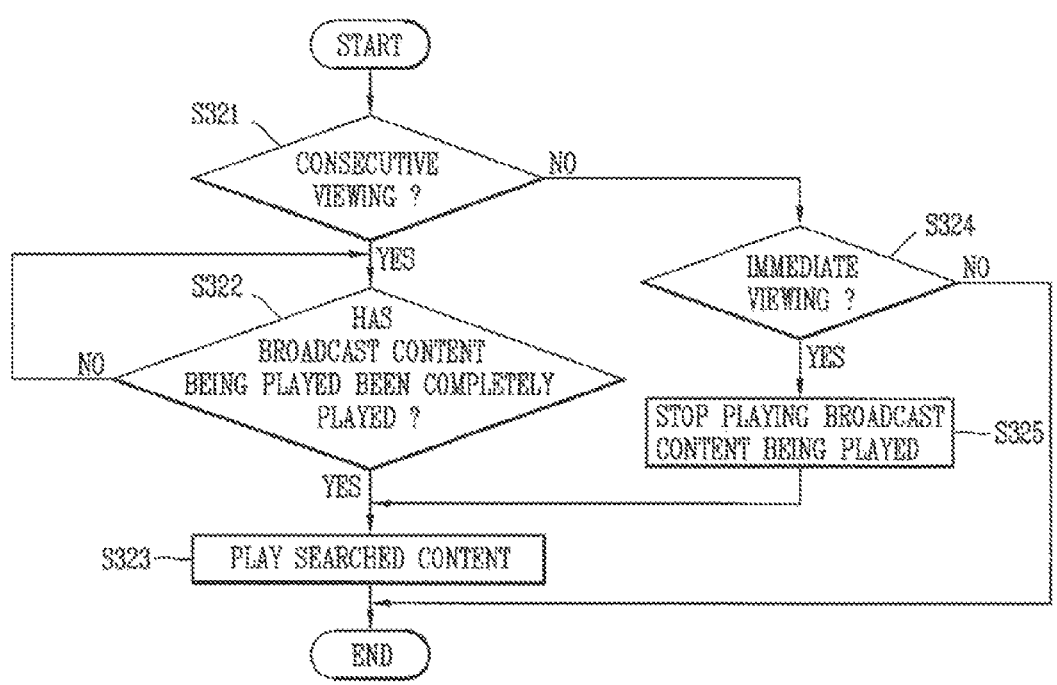
FIG. 10 is a flowchart showing a method for processing searched pre-stored content by a mobile terminal in accordance with an embodiment of the present invention.

FIG. 10 is a flowchart showing a method for processing searched pre-stored content by the mobile terminal according to an embodiment of the present invention.

Referring to FIG. 10, the controller 180 of the mobile terminal 100 displays a search result with respect to related content and determines whether to process the searched content according to a control signal input via the user input unit 130. Once a control signal input is received, the controller 180 determines whether the control signal comprises a consecutive viewing function (S321). Specifically, the controller 180 determines whether the control signal is a command instructing the content searched to be subsequently displayed after the current broadcast has been played.

The controller 180 determines whether the broadcast content being currently played has been completely played (S322) if the control signal is a consecutive viewing command.

The controller 180 processes the searched content from the memory 160 in order to play the content once the current broadcast played has been completely played (S323).

If the control signal input via the user input unit 130 is not a consecutive viewing command, the controller determines if the command signal input is for an immediate viewing function in S324. In an immediate viewing function, the controller 180 stops playing the current broadcast content, and then plays the searched content (S324, S325). If the searched content has been completely played, the controller 180 resumes the play of the stopped content.

Moreover, if the control signal input via the user input unit 130 is neither a consecutive viewing nor an immediate viewing command, the controller 180 terminates the display of the searched results, and continuously plays the current broadcast content.

Figure 11:
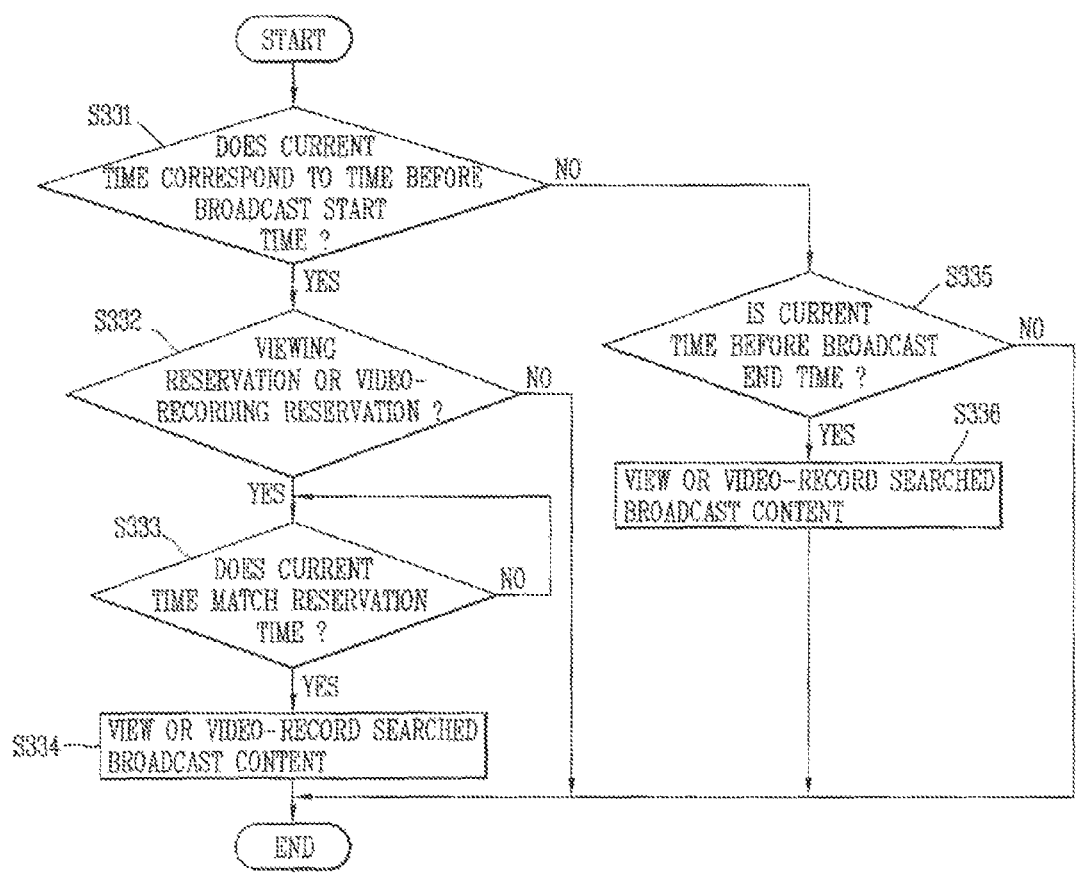
FIG. 11 is a flowchart showing a method for processing searched real-time broadcast content by a mobile terminal in accordance with an embodiment of the present invention.

FIG. 11 is a flowchart showing a method for processing searched real-time broadcast content by the mobile terminal according to an embodiment of the present invention.

The controller 180 compares the current time with schedule information included in the broadcast service guide information of the searched real-time broadcast content if real-time broadcast content relating to currently played broadcast content is searched. For example, the controller 180 determines whether the current time is before a broadcast start time of the searched real-time broadcast content (S331).

If the current time is before the broadcast start time, the controller 180 determines whether a viewing reservation or a video-recording reservation has been set (S332). Specifically, the controller 180 determines whether a viewing or video-recording reservation has been set with respect to a searched real-time broadcast content. If a reservation setting is requested, the controller 180 sets the broadcast start time as a reservation time.

After executing the reservation setting, the controller 180 determines whether the current time matches the reservation time (S333). If the current time matches the reservation time, the controller 180 receives the searched broadcast content via the broadcast receiving module 111. Then, the controller 180 plays the received broadcast content or video-records the received broadcast content (S334). The controller 180 may output an alarm signal when broadcast viewing or video-recording has begun.

If the current time is not before the broadcast start time in S331, the controller 180 determines whether the current time is before a broadcast end time (S335). If the current time is before the broadcast end time, the controller 180 receives one or more searched real-time broadcast content via the broadcast receiving module 111. And, the controller 180 plays the received broadcast content or video-records the received broadcast content (S336).

If the current time is after the broadcast end time in S335, the controller 180 determines that search of related content has failed. Then, the controller 180 informs a user that broadcasting of the searched real-time broadcast content has terminated, and displays broadcast schedule information of the corresponding broadcast content. The user may set a viewing reservation or a video-recording reservation based on the broadcast schedule information.

Figure 12:
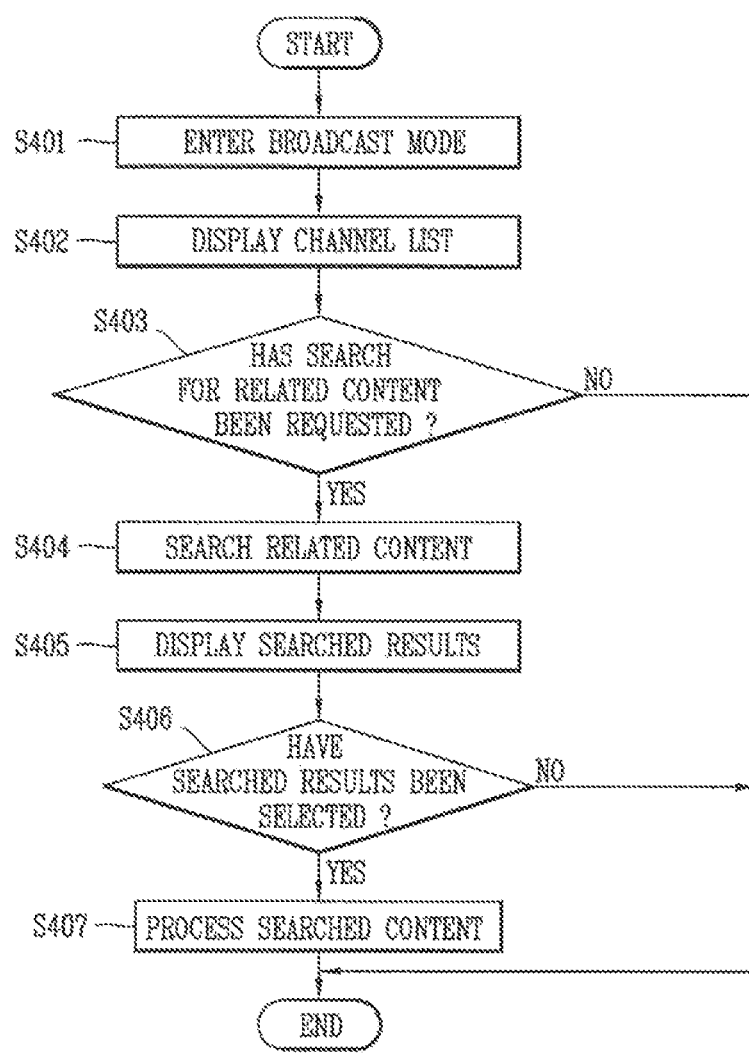
FIG. 12 is a flowchart showing a related content providing method by a mobile terminal according to another embodiment of the present invention.

FIG. 12 is a flowchart showing a related content providing method by a mobile terminal according to one embodiment of the present invention.

Once a broadcast menu is selected by a user, the controller 180 enters a broadcast mode (S401). Then, the controller 180 displays a channel list according to the service ID information of broadcast service guide information (S402). The controller 180 may read the broadcast service guide information from the memory 160 or via the broadcast receiving module 111.

If related content is requested while displaying the channel list, the controller 180 searches related content according to each channel displayed on the screen (S403, S404). More specifically, if related content is requested by a user, the controller 180 searches for related content, according to the broadcast service guide information of video-recorded and captured content pre-stored in the memory. The controller 180 checks a similarity between service ID information of each channel shown on the channel list and service ID information of content pre-stored in the memory. If the checked similarity is greater than a threshold value, the controller 180 determines that the corresponding pre-stored content is related data.

The controller 180 displays the search results (S405) once the search for related content has been completed. The controller 180 may display the number of related searched results or whether or not any related searched result exists according to each channel.

If one of the displayed related searched results is selected, the controller 180 displays a list of the related searched results in a pop-up manner (S406, S407). For example, if an icon indicating a related-searched result is selected, the controller 180 displays the related searched result corresponding to the selected icon on the screen. Here, the controller 180 allocates priorities to related searched results based on various factors such as storage time or a similarity, and displays the related searched results according to the allocated priorities.

In the embodiment described above, video-recorded or captured content stored in the mobile terminal are searched. However, the present invention is not limited to searching video-recorded or captured content. Accordingly, video-recorded or captured content stored in another mobile terminal may be searched via a short-range wireless communication or a wireless communication.

If a content stored in another mobile terminal is selected, the mobile terminal requests the selected content from the other mobile terminal. Then, the other mobile terminal transmits the selected content to the mobile terminal via a wireless communication.

FIGS. 13A to 13D illustrate an example of providing related content when a mobile terminal according to one embodiment of the present invention enters a broadcast mode.

Figure 13A:
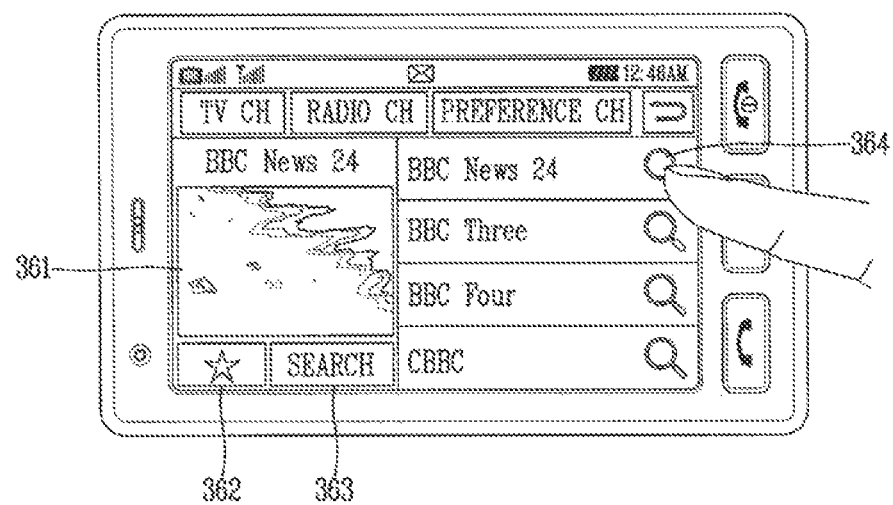
FIGS. 13A to 13D are views showing one example of providing related content according to another embodiment of the present invention.

Referring to FIG. 13A, when a user selects a broadcast menu, the controller 180 enters a broadcast mode and operates the broadcast receiving module 111. The controller 180 displays a channel list according to the broadcast service guide information. The broadcast service guide information may be provided from the broadcast center via the broadcast receiving module 111 or may be read from the memory 160.

The controller 180 displays a preview screen 361 of the selected channel when a channel is selected from the displayed channel list. The screen displaying the channel list includes a preference registration/release icon 362 for registering or releasing a preference for the channel being previewed, and a channel search icon 363 for searching channels that are viewable on the current screen. When a broadcast function is executed for a first time, the viewable channels are searched via the channel search icon 363.

If a related search icon 364 is selected by a user, the controller 180 searches for pre-stored content relating to the corresponding channel item from the memory. For example, when the related search icon 364 for "BBC News 24" is selected (FIG. 13A), the controller 180 may search for pre-stored content relating to broadcast service guide information about BBC News 24.

Figure 13B:
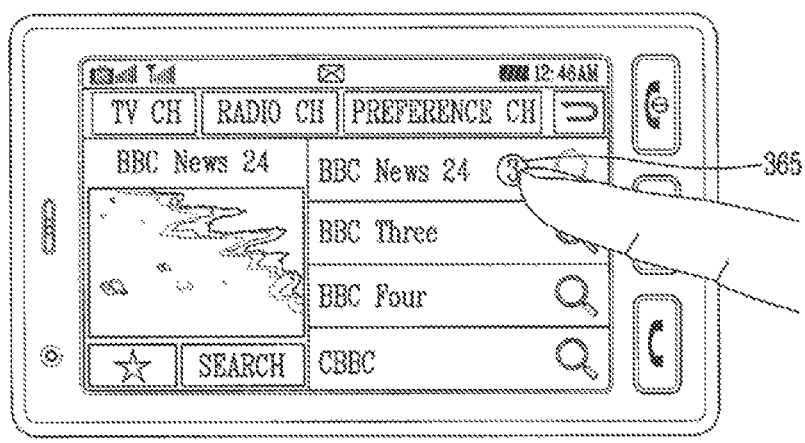

If pre-stored content relating to the selected channel item has been identified as a result of the search, the controller 180 displays an indicator 365 indicating that the pre-stored content has been identified (FIG. 13B). After identifying the pre-stored content, the controller 180 displays an icon indicating the number of the searched pre-stored content. For example, if the search identifies that three pre-stored content are associated with a service ID of the BBC News 24, the controller will display a search result indicator 365 with the number three.

Figure 13C:
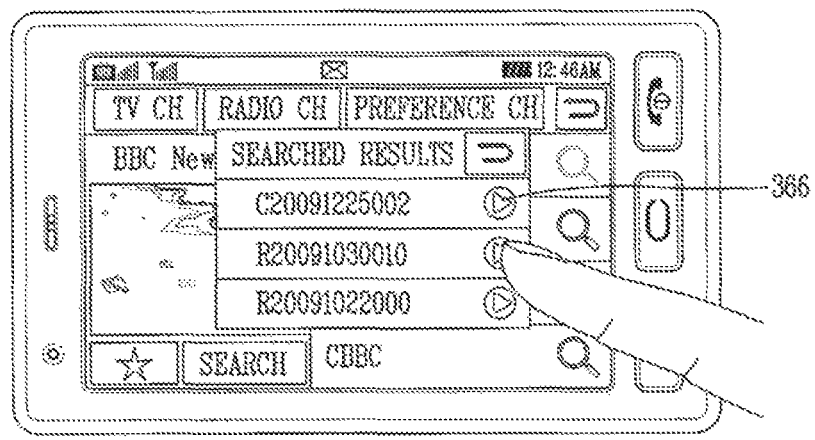

If the displayed indicator 365 is selected (FIG. 13B), the controller 180 displays a list of searched results on a popup window (FIG. 13C). A play icon 366 is provided with each searched result on the popup window. The controller 180 may display the searched pre-stored content on the popup window according to information associated with each file, such as creation date, last play time, or play frequency.

Figure 13D:
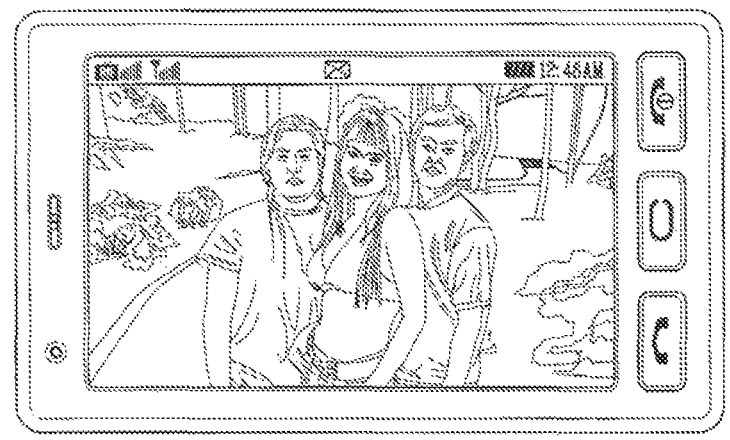

If one item is selected from the list, the controller 180 reads the pre-stored content of the selected item from the memory for playback, and displays the played pre-stored content on the screen (FIG. 13D).

In the embodiment described above, a user performs a search for related content with respect to a specific channel. Additionally, when the mobile terminal enters a broadcast mode, all content relating to each channel on the channel list may be searched. Furthermore, displaying the identified pre-stored content according to each channel may be optional.

Figure 14:
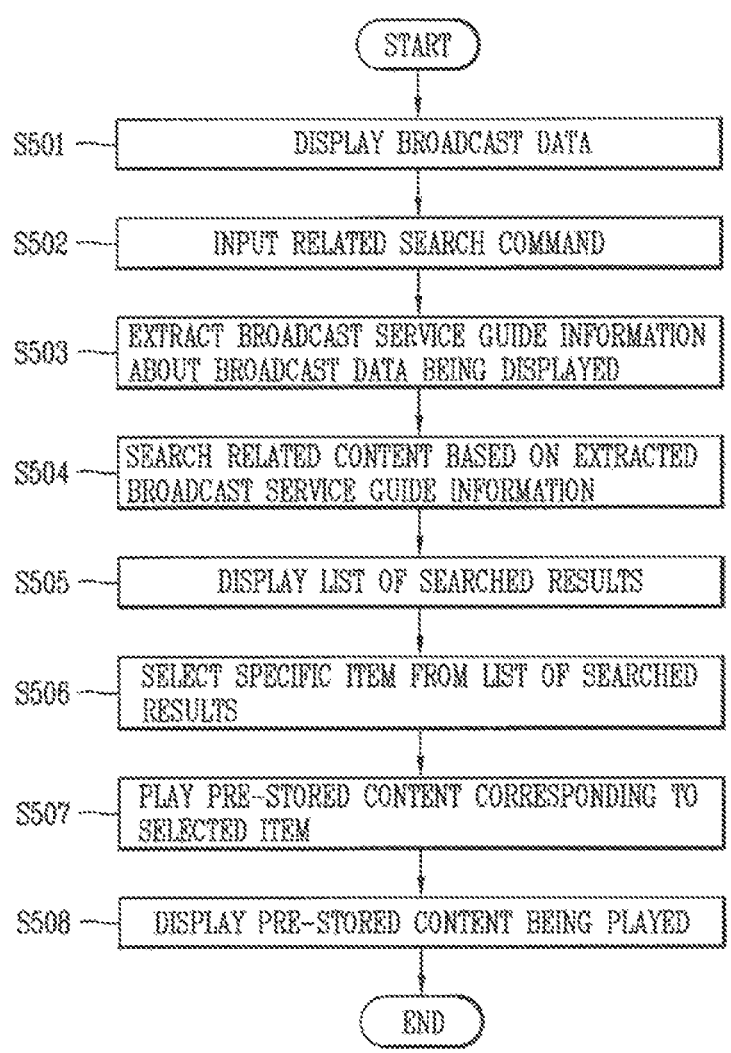
FIG. 14 is a flowchart showing a related content providing method by a mobile terminal according to another embodiment of the present invention.

FIG. 14 is a flowchart illustrating a related content providing method by a mobile terminal according to one embodiment of the present invention.

If a user selects a specific broadcast channel, the controller 180 receives broadcast data provided from the broadcast channel via the broadcast receiving module 111. After selecting a specific broadcast channel, the controller 180 plays the received broadcast data for output to the display 150 (S501).

While playing the broadcast data received via the broadcast receiving module 111, the controller 180 may receive a related search command from the user input unit 130 (S502).

After receiving the related search command, the controller 180 extracts broadcast service guide information about broadcast data being currently displayed on the display from the pre-stored broadcast service guide information (S503). Specifically, the controller 180 extracts, from the pre-stored broadcast service guide information, a ServiceID, a ContentID, and a ScheduleEventTable of a broadcast program being currently provided.

Once the broadcast service guide information has been extracted, the controller 180 searches for pre-stored content relating to the displayed broadcast data according to the extracted broadcast service guide information (S504). More specifically, the controller 180 searches for related content by mapping the extracted broadcast service guide information with broadcast service guide information of the pre-stored content. If the pre-stored content has been completely searched, the controller 180 displays a list of the identified pre-stored content on the screen (S505).

If one item is selected from the displayed list, the controller 180 reads, from the memory, pre-stored content corresponding to the selected item, and transmits the read pre-stored content to the multimedia module 181 (S506).

The multimedia module 181 plays the received pre-stored content under control of the controller 180, and transmits the played pre-stored content to the display 151 (S507). The display 151 displays the played pre-stored content received from the multimedia module 181 on the screen (S508).

The played pre-stored content may be displayed on one region of the screen. For example, similar to a picture in picture (PIP) technique, the controller 180 may display broadcast data being currently broadcast on a main screen of the display 151, and may display played pre-stored content on a sub screen of the display 151.

Alternatively, the controller 180 may display the played pre-stored content on the screen while stopping the reception of the broadcast data via the broadcast receiving module 111. Furthermore, the controller 180 may store the broadcast data received via the broadcast receiving module 111 in the memory 160 while playing the pre-stored content. After playback of the pre-stored content, the controller 180 may play the broadcast data stored in the memory 160.

FIGS. 15A to 15F illustrate an example for providing pre-stored content relating to a broadcast being currently provided by a mobile terminal according to a third embodiment of the present invention.

Figure 15A:
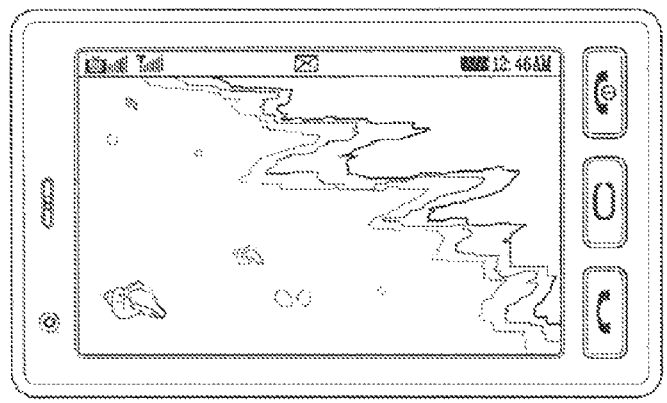
FIGS. 15A to 15F illustrate an example for providing pre-stored content relating to a broadcast being currently provided by a mobile terminal according to another embodiment of the present invention.
Figure 15B:
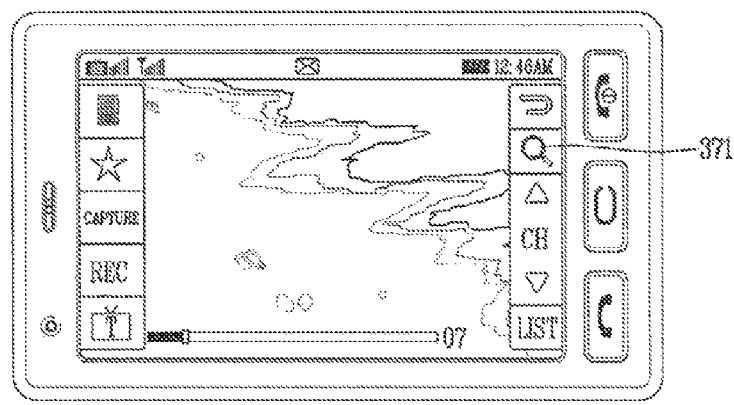

The controller 180 performs A/V decoding of broadcast data received via the broadcast receiving module 111, thereby displaying the broadcast data on the screen (FIG. 15A). The controller 180 displays control icons (FIG. 15B) after sensing a touch input on the display.

Figure 15C:
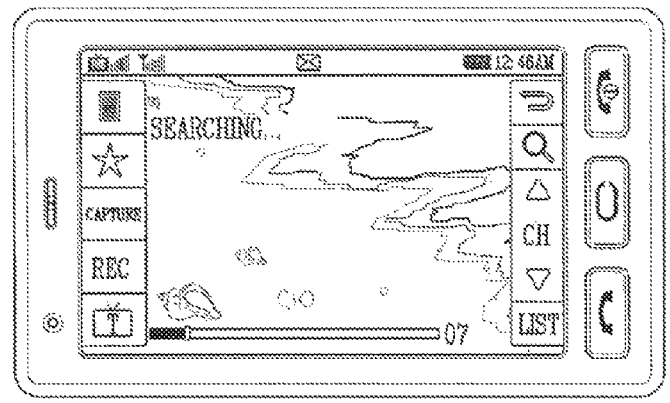

If a related search icon 371 is selected from the control icons, the controller 180 extracts, from the pre-stored broadcast service guide information, broadcast service guide information for a broadcast program being currently provided. The controller 180 may then search for pre-stored content associated with the broadcast program being viewed, based on the extracted broadcast service guide information. In this example, the controller 180 may display, on the screen, an indicator or a message indicating that a related search is being executed (FIG. 15C).

Figure 15D:
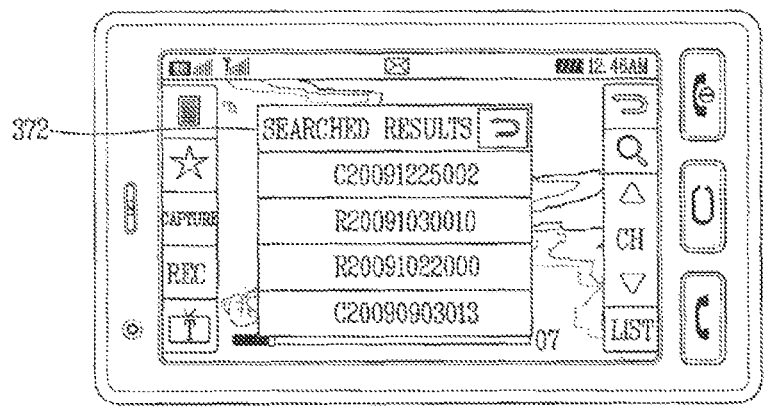
Figure 15E:
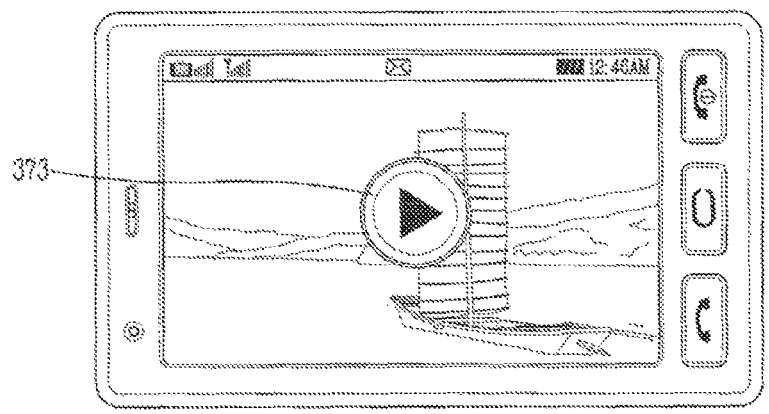
Figure 15F:
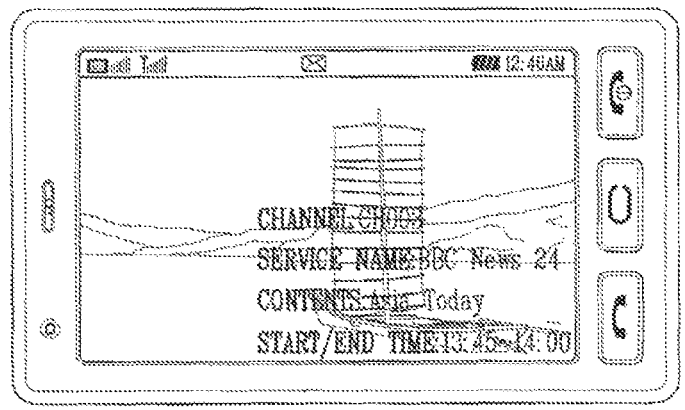

If the related search has been completed, the controller 180 displays a list of searched results on a popup window 372 (FIG. 15D). If one of the displayed searched results is selected, the controller 180 reads pre-stored content corresponding to the selected result from the memory 160, and displays a preview screen (FIG. 15E). If the play icon 373 is selected, the controller 180 plays corresponding content. Here, the controller 180 displays pre-stored broadcast service guide information with the corresponding content (FIG. 15F). In the embodiment described above, broadcast service guide information is displayed on a pre-stored content play screen in an overlapped manner. However, the screen may be divided into two regions, such that the pre-stored content is displayed on one region and broadcast service guide information is displayed on another region.

Figure 16:
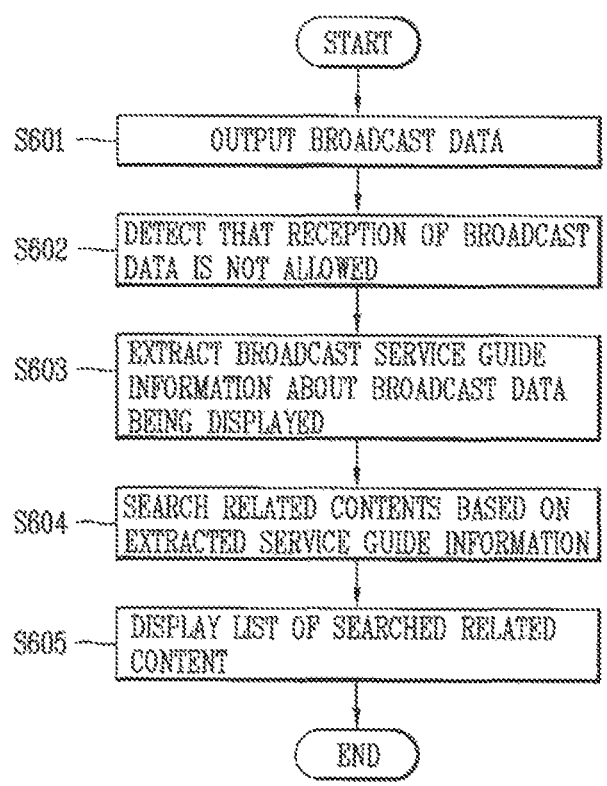
FIG. 16 is a flowchart showing a related content providing method by a mobile terminal according to another embodiment of the present invention.

FIG. 16 is a flowchart showing a related content providing method by a mobile terminal according to one embodiment of the present invention.

The controller 180 of the mobile terminal 100 receives broadcast data via a specific broadcast channel, and outputs the broadcast data to the screen (S601).

While outputting the broadcast data, the controller 180 may detect that the mobile terminal 100 has entered an out of coverage (OOC) area where broadcast data being currently provided cannot be received, or an area where broadcast reception is restricted (S602).

If it is detected that the mobile terminal 100 has entered an area where broadcast reception is not available, the controller 180 extracts, from the pre-stored broadcast service guide information, broadcast service guide information of the broadcast data being currently provided (S603).

When the broadcast service guide information has been extracted, the controller 180 searches for pre-stored content relating to the broadcast data being currently provided (S604).

After searching for the pre-stored content relating to the broadcast data, the controller 180 may output a list of pre-stored content found as a result of the search (S605). If only one pre-stored content is found via the search, the controller 180 may automatically output the pre-stored content to the screen. On the other hand, if the number of found pre-stored content is greater than one, the controller 180 displays a list of the found pre-stored content. When one content is selected from the list of the pre-stored content, the controller 180 plays and displays the selected content.

If any pre-stored content relating to the broadcast data was not found, the controller 180 outputs an alarm signal indicating that no related pre-stored content exists. In this example, the controller 180 may display information about channels that may be broadcast at the current location or may display pre-stored content located in the memory which are not related to the broadcast data.

FIGS. 17A to 17F are views showing an example for providing pre-stored content relating to broadcast data disrupted when a mobile terminal according to one embodiment of the present invention enters a region where broadcast reception is restricted.

Figure 17A:
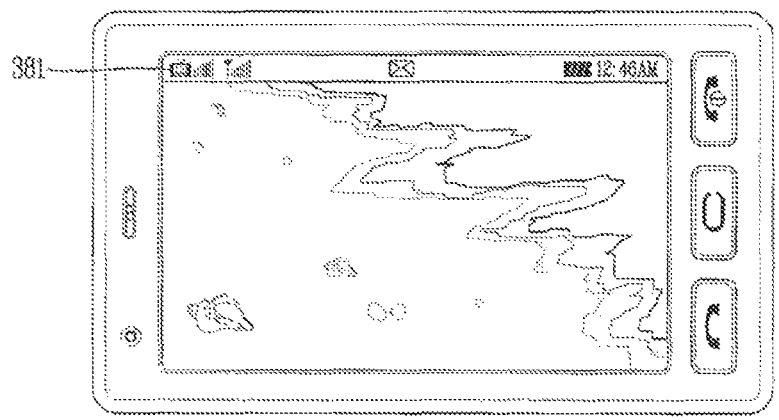
FIGS. 17A to 17F illustrate an example for providing pre-stored content relating to broadcast data disrupted when a mobile terminal enters a region where broadcast reception is not allowed.
Figure 17B:
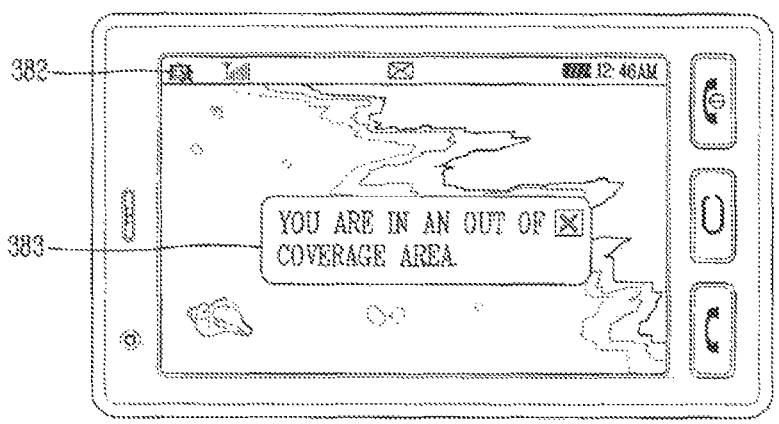

If the mobile terminal 100 enters an OOC area while a user views a broadcast, the controller 180 detects that broadcast reception has been restricted. The controller 180 then stops receiving a broadcast signal and changes an indicator 381 indicating a reception intensity of the broadcast signal into an indicator 382 indicating that receiving the broadcast signal is restricted (FIGS. 17A-17B). Additionally, the controller 180 may display a message 383 indicating, that broadcast viewing is not available.

Accordingly, after determining that broadcast reception is restricted, controller 180 searches for pre-stored content relating to the broadcast data having been disrupted. For example, if the mobile terminal enters an OOC area while CH003 is broadcast, the controller 180 determines if any content created from broadcast data provided from CH003 exists among the content stored in memory.

Figure 17C:
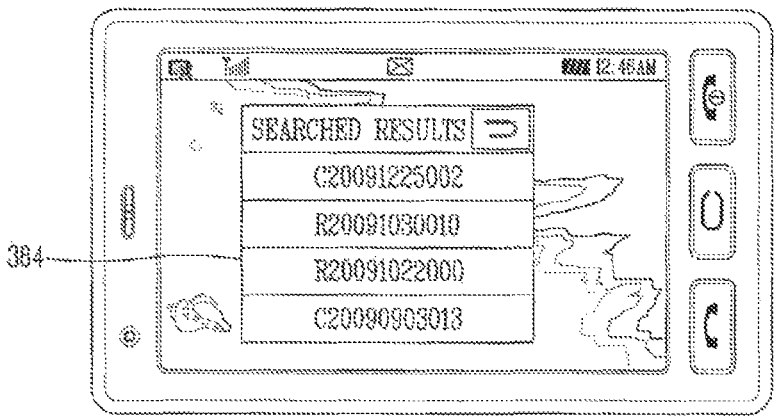
Figure 17D:
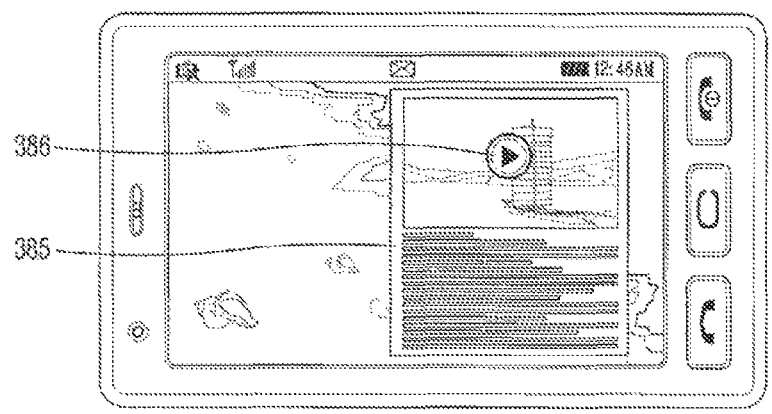

If the search has been completed, the controller 180 displays a list of results on a popup window 384 (FIG. 17C). If one of the results is selected, the controller 180 outputs a detailed view 385 of the pre-stored content corresponding to the selected result (FIG. 17D).

Figure 17E:
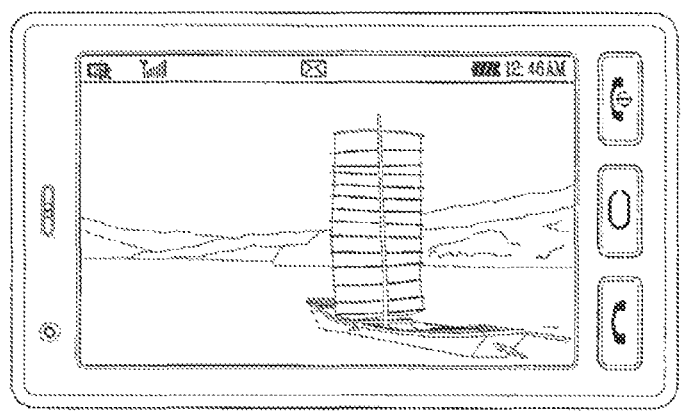
Figure 17F:
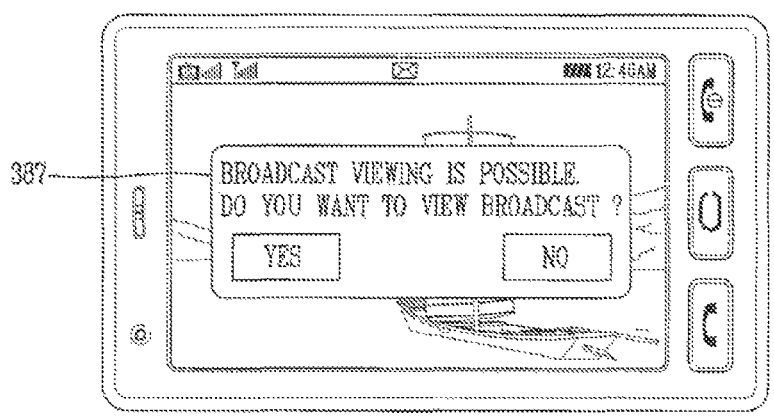

If a play icon 386 of the detailed view 385 is selected, the controller 180 plays the content on the screen (FIG. 17E). If the mobile terminal 100 leaves the OOC area while the content in the detailed view is output, the controller 180 may output a popup window 387 informing that broadcast viewing is now possible (FIG. 17F). If a response to an inquiry displayed on the popup window 387 is input, the controller 180 executes a subsequent operation corresponding to the response. More specifically, if a positive response has been received, the controller 180 receives, via the broadcast receiving module 111, the broadcast data which was previously disrupted, and displays the received broadcast data. On the other hand, if a negative response has been received, the controller 180 continues to play the content in the detailed view 385.

Figure 18A:
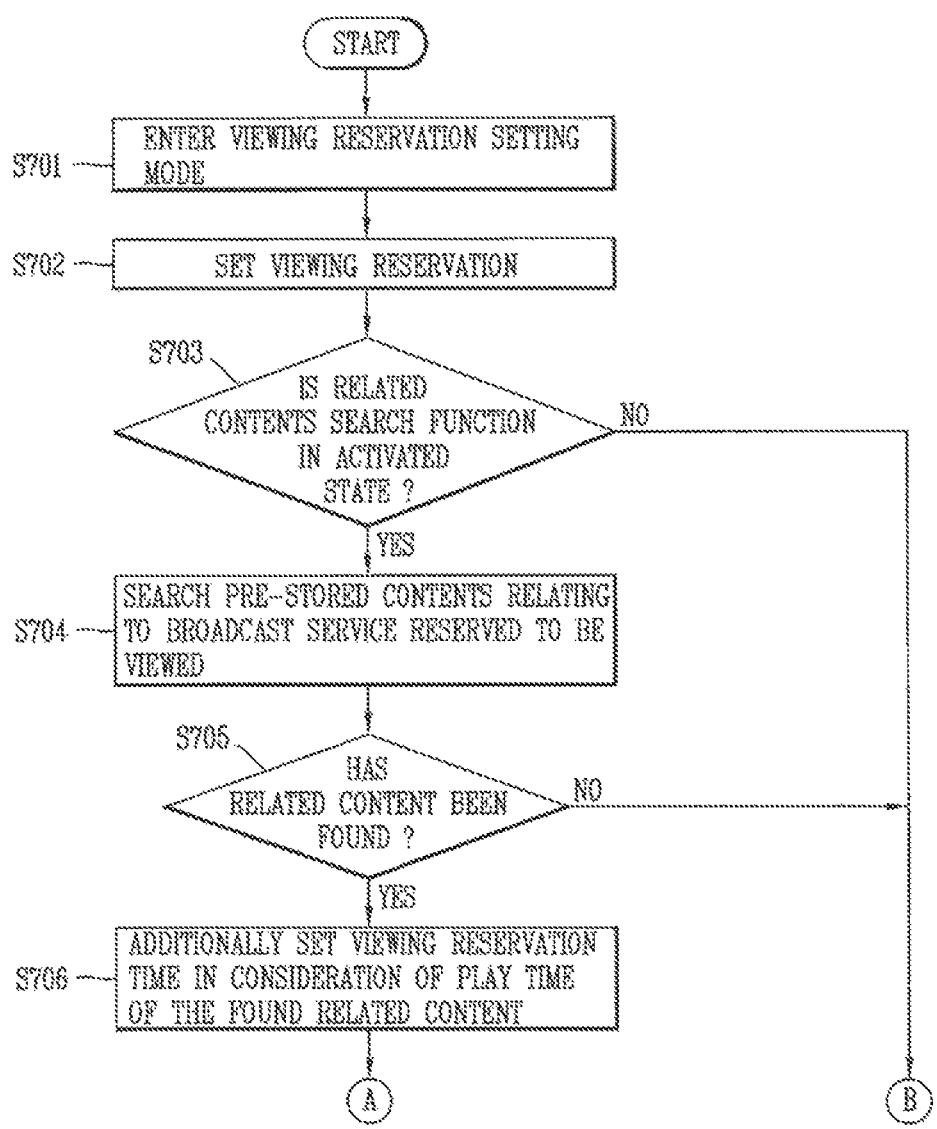
FIG. 18A to 18B is a flowchart showing a related content providing method by a mobile terminal according to another embodiment of the present invention.

FIG. 18 is a flowchart showing a related content providing method by a mobile terminal according to one embodiment of the present invention.

Referring to FIG. 18, the controller 180 enters a reservation setting mode according to a user's input (S701) and the controller 180 displays a reservation setting screen on the screen.

After entering the reservation setting mode, the controller 180 sets a reservation according to data input via the user input unit 130 (S702). The reservation setting screen includes fields such as a reservation date, a viewing time, a broadcast channel or broadcast program, and activation/non-activation of a related content search function. If the data input to each filed of the reservation setting screen has been completed, the controller 180 stores the reservation information in the memory 160.

If the reservation setting has been completed, the controller 180 determines whether a related content search function has been activated based on the reservation information (S703). If the related content search function is activated, the controller 180 searches the memory for pre-stored content relating to broadcast data reserved to be viewed (S704).

Figure 18B:
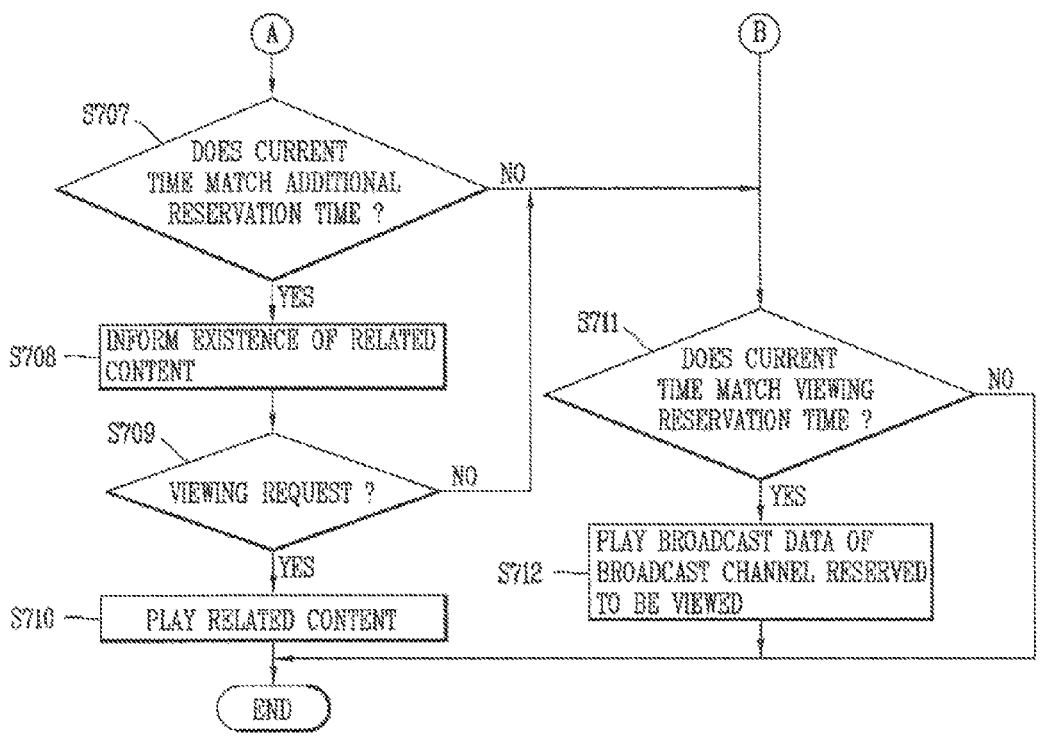

If the related content search function is not activated, the controller 180 determines if the current time matches the reservation time (S711, FIG. 18B).

If the search for related content has been completed, the controller 180 determines if any related content was found (S705).

If any related content was found as a result of the search, the controller 180 sets an additional reservation time in consideration of a play time of the found pre-stored content (S706). When the number of the found pre-stored content is greater than one, the controller 180 sets a reservation time with consideration of an entire play time of the found pre-stored content. For example, if the total play time for two found pre-stored content is one hour and forty five minutes, and a reservation time is set for 8:00 PM, the controller 180 sets a reservation time as 6:15 PM such that the searched pre-stored content can be played before the original reservation time.

If related content was not found in S705, the controller 180 determines if the current time matches the reservation time (S711, FIG. 18B).

As illustrated in FIG. 18B, after setting the additional reservation time in consideration of the play time of the found pre-stored content, the controller 180 determines whether the current time is consistent with the additional reservation time (S707).

If the current time matches the additional reservation time, the controller 180 outputs an alarm signal indicating that pre-stored content relating to a broadcast program reserved to be viewed have been found (S608).

If a viewing approval response to the alarm signal has been input, the controller 180 plays the corresponding pre-stored content (S709, S710).

On the other hand, if a viewing refusal response to the alarm signal has been input, the controller 180 determines if the current time matches the reservation time (S711).

If the current time does not match the additional reservation time (S707), the controller 180 determines whether the current time matches the reservation time (S711).

If the current time matches reservation time, the controller 180 operates the broadcast receiving module 111 to receive broadcast data for a broadcast channel which was reserved to be viewed, and outputs the received broadcast data to the display (S712).

Additionally, if the current time matches the reservation time, the controller 180 may inform a user that it is now the reservation time for viewing a broadcast program. The controller 180 may then receive and play the broadcast data reserved to be viewed according to the user's response.

FIGS. 19A to 19E illustrate an example for a viewing reservation process by a mobile terminal according to one embodiment of the present invention.

Figure 19A:
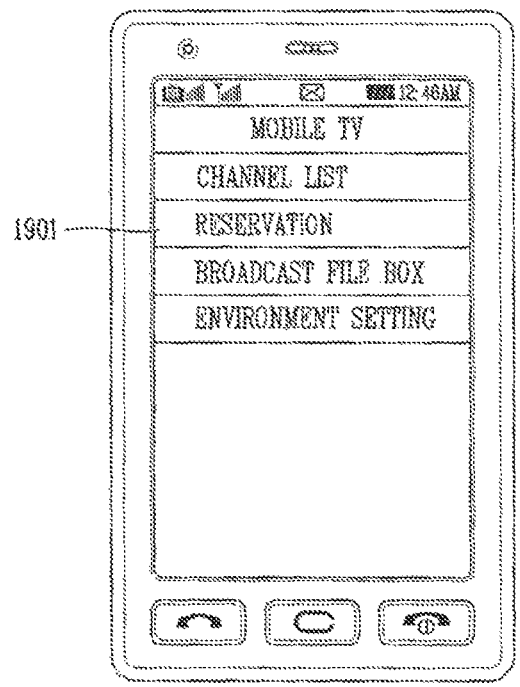
FIGS. 19A to 19E are views showing an example for viewing a reservation process by a mobile terminal according to another embodiment of the present invention.
Figure 19B:
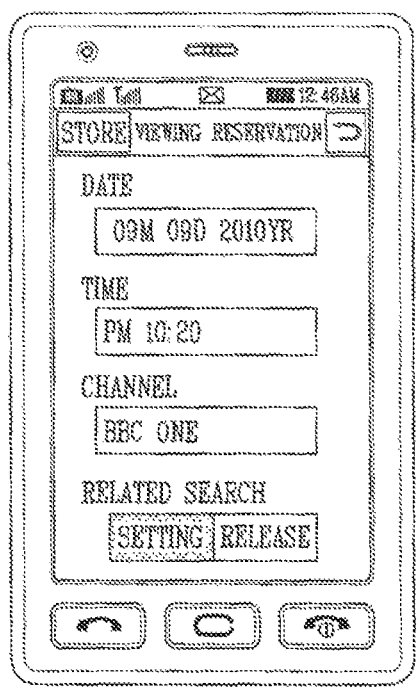
Figure 19C:
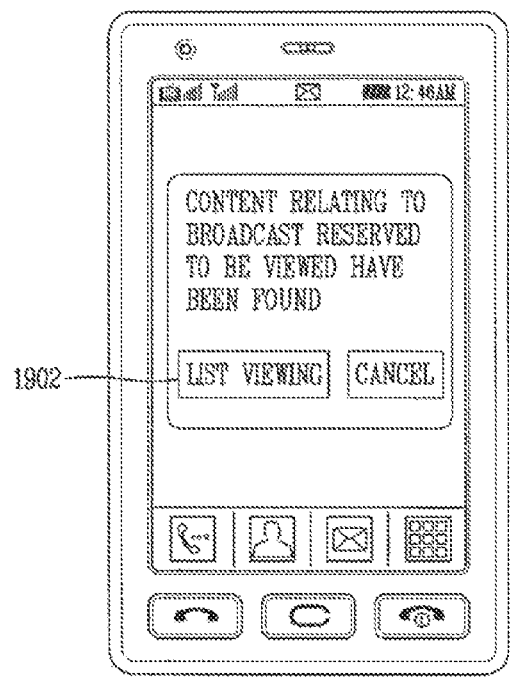

As shown in FIG. 19A, if a broadcast menu is selected, the controller 180 displays sub menus on the screen. If a reservation 1901 is selected from the displayed sub menus, the controller 180 enters a reservation setting mode (FIG. 19B). As shown in FIG. 19B, the controller 180 displays a reservation setting screen on the display 151.

The controller 180 inserts data input via the user input unit 130 into each field positioned on the reservation setting screen. If the data input to each field has been completed, the controller 180 stores the reservation information. Additionally, the controller 180 determines whether a related content search function has been set to the viewing reservation information.

If the related content was found (FIG. 19C), the controller 180 outputs a message indicating that pre-stored content relating to the broadcast channel reserved to be viewed has been found. Additionally, the controller 180 may output a sound effect.

Figure 19D:
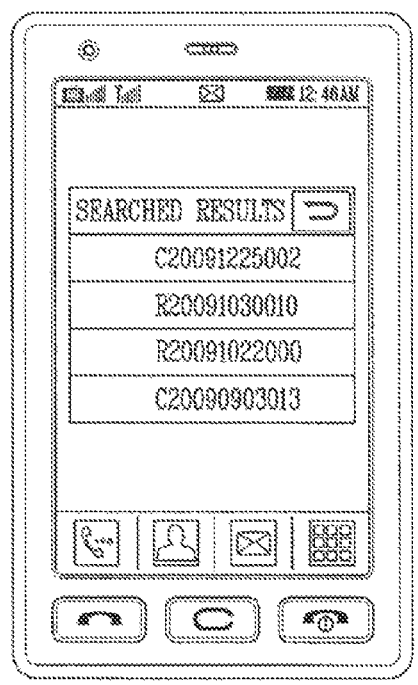

If the user selects a list view icon 1902, the controller 180 displays a list of found pre-stored content (FIG. 19D). If one of the found pre-stored content is selected, the controller 180 plays the corresponding pre-stored content.

Figure 19E:
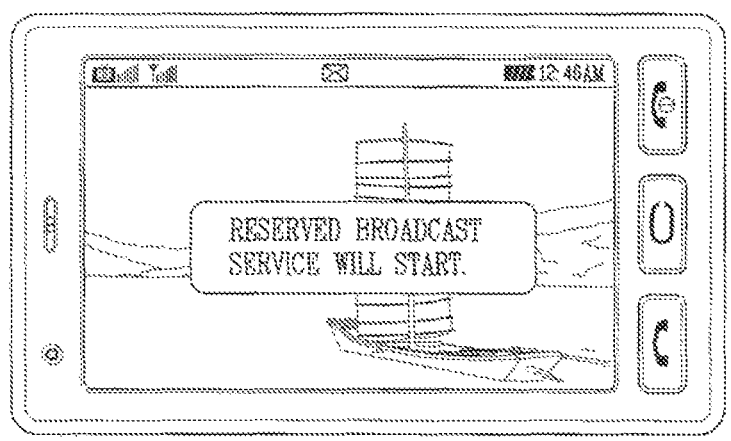

If the current time matches the reservation time, the controller 180 outputs an alarm signal indicating the start of a reserved broadcast service (FIG. 19E).

For example, if a fourth episode of "The A-Team" has been reserved to be viewed, the controller 180 determines whether pre-stored content relating to "The A-Team" exists. If the memory contains the third episode of "The A-Team," the controller 180 informs a user that the memory contains the third episode "The A-Team." Accordingly, the user may view the third episode of "The A-Team" before viewing the fourth episode, or the user may only choose to view the broadcast service guide information of the third episode in order get more information, such as understanding the plot line.

In the example provided above, a reservation has been executed via a reservation menu. However, the reservation may also be set by selecting a desired broadcast channel or broadcast program from a screen displaying one of a broadcast schedule, a channel list, and a broadcast program list.

Figure 20:
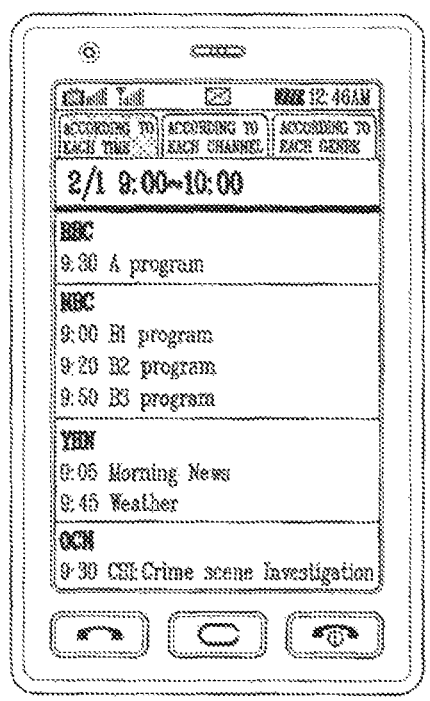
FIG. 20 is a view showing another example for viewing a reservation process by a mobile terminal according to another embodiment of the present invention.
Figure 20:
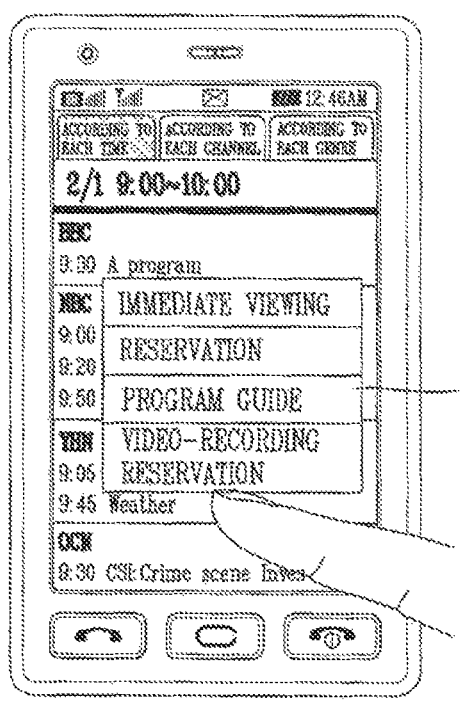
Figure 20:
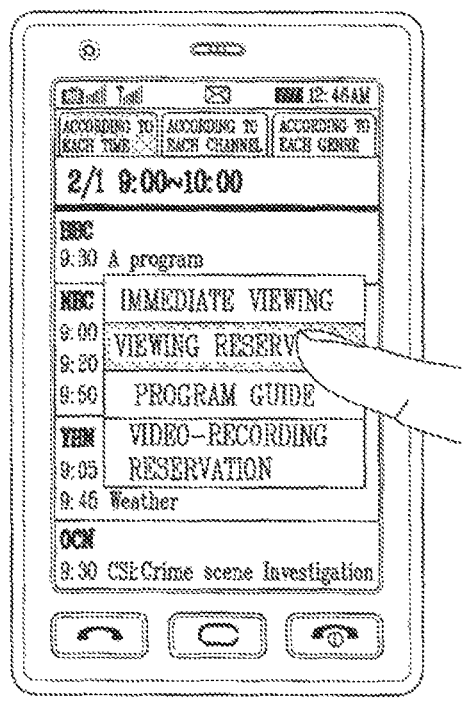

Referring to FIG. 20A, the controller 180 may display a broadcast schedule. Referring to FIG. 20B, when a long touch is input on one of the programs on the broadcast schedule, the controller may display a menu 2001. Referring to FIG. 20C, a reservation icon may be selected from the menus displayed on the menu 2001, and the controller 180 may set a reservation according to the broadcast service information of the selected program.

Figure 21:
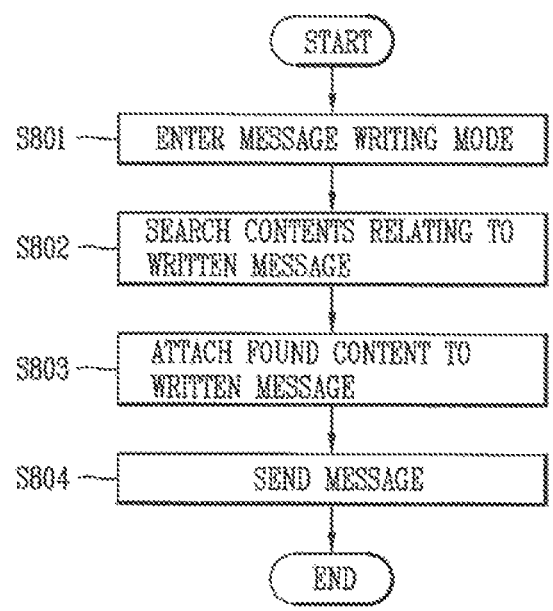
FIG. 21 is a flowchart showing a related content providing method by a mobile terminal according to another embodiment of the present invention.

FIG. 21 is a flowchart for a related content providing method by a mobile terminal according to one embodiment of the present invention.

The controller 180 may enter a message writing mode according to a user's input, and may display a message writing screen on the display 151 (S801).

If a related search is requested by a user after the writing of the message has been completed, the controller 180 searches for pre-stored content relating to the written message (S802). For example, if the written message is relevant to weather, the controller 180 searches the memory for pre-stored content associated with "weather," such as "weather news."

If the process for searching for related content has been completed, the controller 180 attaches the found pre-stored content to a message (S803). When the number of the found pre-stored content is greater than one, the controller 180 may select a predetermined number of content to attach to a message.

If a sending command is input by a user, the controller 180 sends the message having the found pre-stored content attached thereto to another party (S804).

Figure 22:
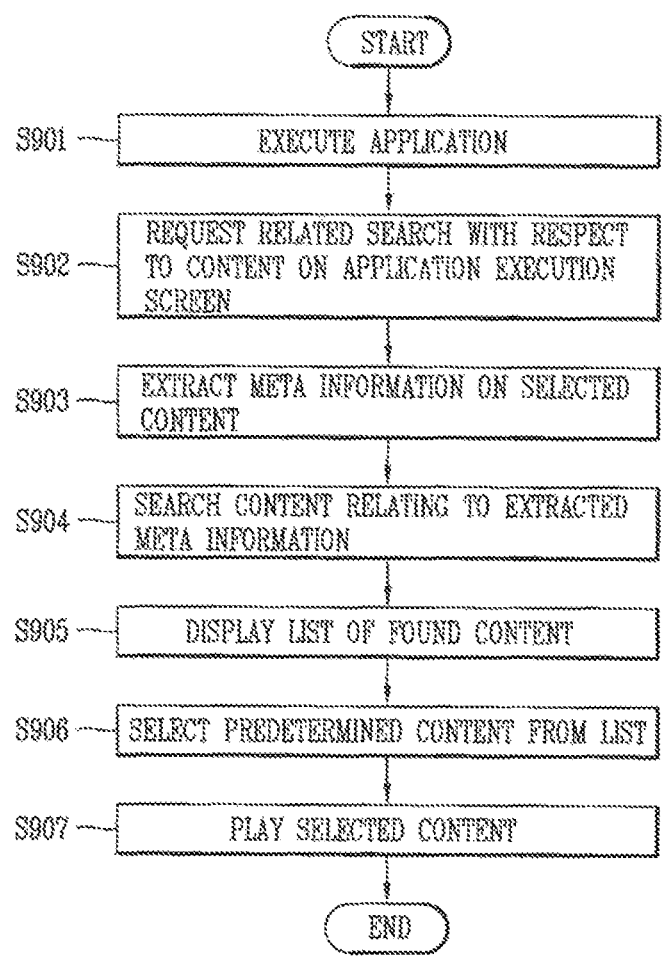
FIG. 22 is a flowchart showing a related content providing method by a mobile terminal according to another embodiment of the present invention.

FIG. 22 is a flowchart for a related content providing method by a mobile terminal according to one embodiment of the present invention.

The controller 180 may execute an application according to a user's input (S901). The application may comprise a web browser, an image viewer, a text viewer, a map, broadcast, or the like.

Once the application has been executed, the controller 180 detects an input of a control command requesting a related search with respect to a content displayed on an application execution screen (S902). Here, the content may comprise images, moving images, photos, texts, or the like.

If the related search is requested, the controller 180 extracts meta information of the requested content (S903). The meta information may comprise a creation date, a file form, a keyword, a file name, a size, a play time, a bit rate, a theme, a writer, a title, or the like.

Once the meta information has been extracted, the controller 180 searches for pre-stored content relating to the extracted meta information (S904).

Once the related content has been found, the controller 180 displays a list of the related content on the screen (S905).

If one of the related content on the list is selected, the controller 180 plays the selected content (S906, S907).

Figure 23:
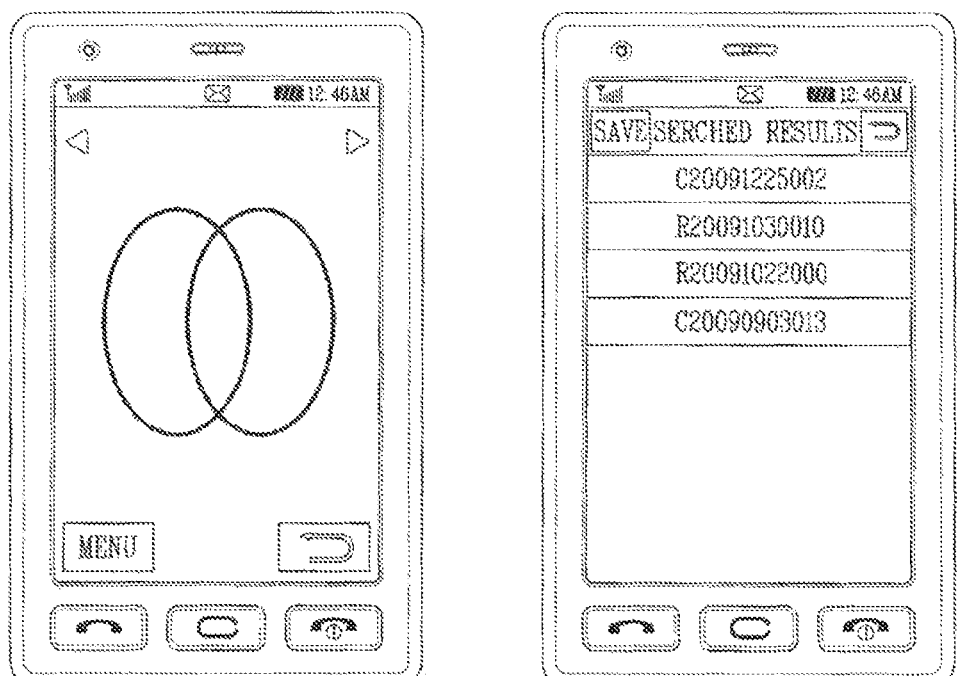
FIG. 23 is a view showing a related content providing method by the mobile terminal of FIG. 22.
Figure 23:
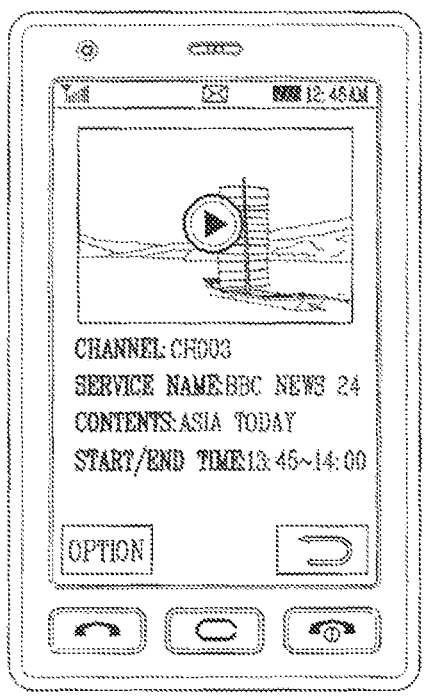

FIG. 23 illustrates a related content providing method by the mobile terminal of FIG. 22.

If an album function is selected by a user's input, the controller 180 executes the album function and displays a list of photos stored in an album. If one of the photos is selected, the controller 180 displays the selected photo (FIG. 23A).

If a related search is requested by a user while the photo is displayed, the controller 180 extracts meta information of the photo. After the meta information has been extracted, the controller 180 searches the memory for content relating to the meta information.

If the search is completed, the controller 180 displays a list of the found content on the screen (FIG. 23B). If one of the found content is selected, the controller 180 displays the selected content on the screen (FIG. 23C).

Figure 24:
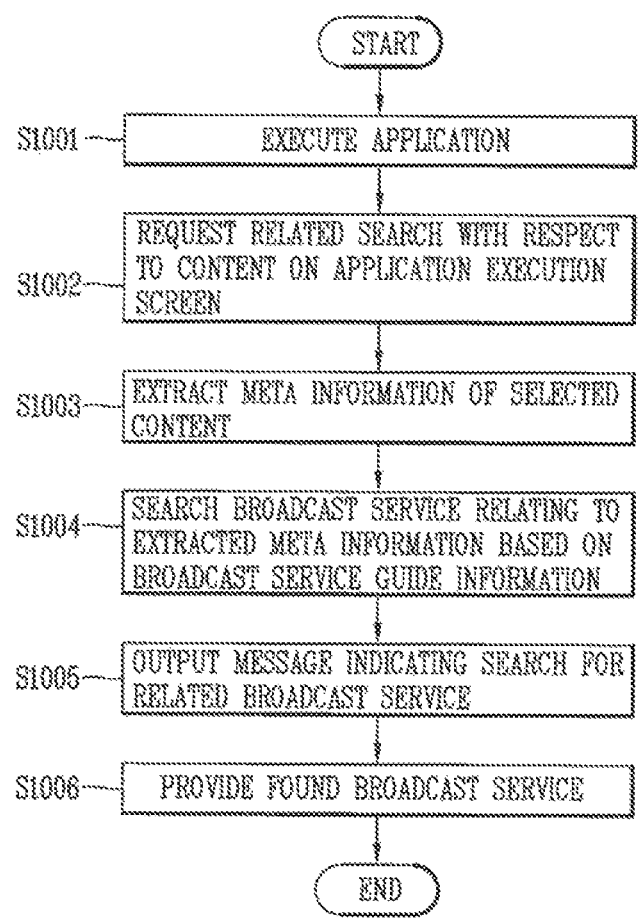
FIG. 24 is a flowchart showing a related content providing method by a mobile terminal according to another embodiment of the present invention.
Figure 25:
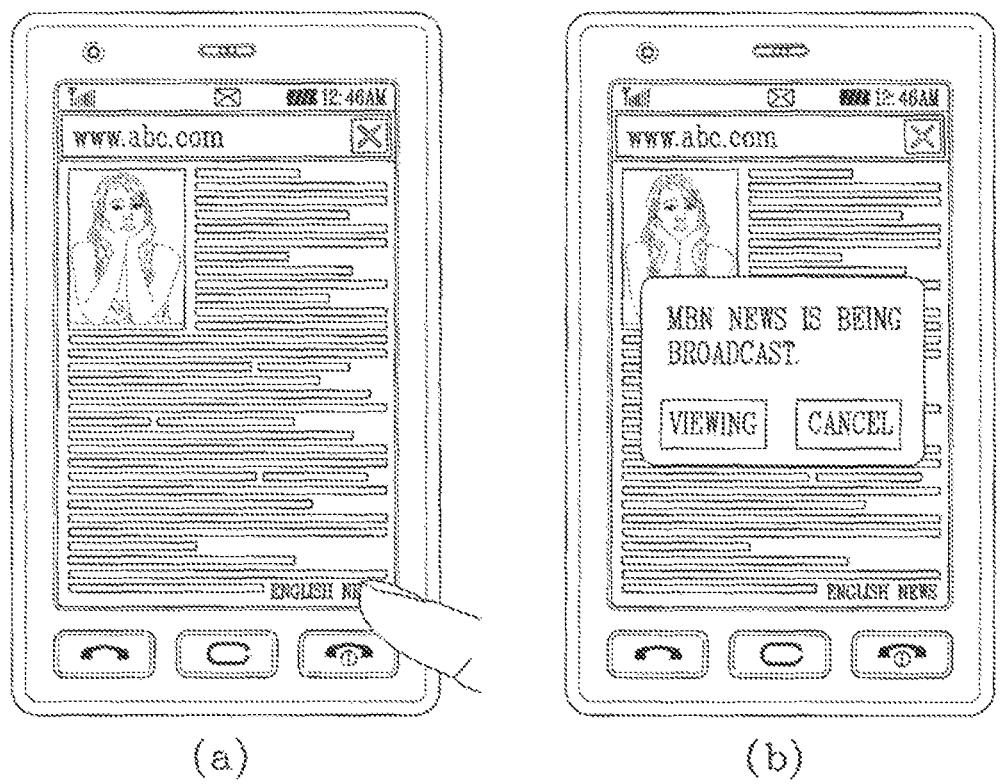
FIG. 25 is a view showing one example of providing related broadcast service by the mobile terminal of FIG. 24.

FIG. 24 is a flowchart for a related content providing method by a mobile terminal according to one embodiment of the present invention. FIG. 25 illustrates an example for providing related broadcast service by the mobile terminal.

Referring to FIG. 24, the controller 180 executes an application according to a user's input (S1001). For example, when a user selects a web browser function, the controller 180 operates the wireless Internet module 113 to execute the web browser function, and the controller 180 displays a web page received via the wireless Internet module 113 on the screen (FIG. 25A).

If a related search with respect to one of the content displayed on the application execution screen is requested, the controller 180 extracts meta information about the corresponding content (S1002, S1003). Referring to FIG. 25A, if a long touch is input on one of the content displayed on the web page, such as "English News," the controller 180 may determine that the long-touch is a search request for related content.

Once the meta information has been extracted, the controller 180 searches for broadcast services relating to the extracted meta information by using the broadcast service guide information (1004). For example, the controller 180 searches for broadcast services having a similar service ID or content ID to the "English News" from the broadcast service guide information. Additionally, the controller 180 searches the broadcast service from broadcast services being currently provided.

Once the related broadcast service has been searched, the controller 180 outputs a message indicating the completion of the search for related broadcast service (S1005). As shown in FIG. 25B, the controller 180 outputs a pop-up message indicating that the search for related broadcast service has been completed.

If the found broadcast service is requested to be viewed, the controller 180 provides the found broadcast service (S1006). The controller 180 operates the broadcast receiving module 111 to receive broadcast data of the found broadcast service and decodes the received broadcast data to display it on the screen.

In the example provided above, a related broadcast service may be immediately viewed. However, if a related broadcast service is found, the controller 180 may reserve the viewing of the found broadcast service according to a user's input.

For example, if a related search is requested by a user while playing a second episode of "LOST" from content stored in the memory, the controller 180 analyzes a similarity between broadcast service guide information included in the file being currently played and broadcast service guide information stored in the memory 160 or received via the broadcast receiving module 111.

If a broadcast service relating to the file being currently played is found via the similarity analysis, the controller 180 displays a message indicating that the "Third episode of 'LOST' will be broadcast at 10:00 PM today." If a user wishes to reserve the found broadcast service, a viewing reservation of the searched broadcast service may be set by the user's input.

When capturing or video-recording digital broadcast data being currently provided, the mobile terminal according to one or more preferred embodiments of the present invention may store broadcast service guide information of the digital broadcast data together with the captured or video-recorded digital broadcast data.

Furthermore, the mobile terminal according to the present invention may search broadcast data relating to a broadcast being currently provided, from captured or video-recorded broadcast data stored therein, based on broadcast service guide information.

Accordingly, in the present invention, content relating to digital broadcast being currently provided may be provided to a user.

The aforementioned method may be implemented as a program code stored in a computer-readable storage medium.

The storage medium may include ROM, RAM, CD-ROM, a magnetic tape, a floppy disc, an optical data storage device, etc. And, the storage medium may be implemented as carrier wave (transmission via the Internet). The computer may include the controller 180 of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of providing related content using broadcast service guide information in a mobile terminal, the method comprising:
    displaying, on a display of the mobile terminal, real-time broadcast content currently provided via a broadcast channel;
    temporarily storing, in a buffer, the broadcast content in response to a first user input for recording or capturing the displayed broadcast content;
    extracting broadcast service guide information associated with the displayed broadcast content from pre-stored broadcast service guide information;
    storing, in a memory, the temporarily stored broadcast content and the extracted broadcast service guide information;
    outputting the stored broadcast content and broadcast service guide information associated with the stored broadcast content by retrieving the stored broadcast content and the broadcast service guide information associated with the stored broadcast content from the memory in response to selection of the stored broadcast content;
    displaying a channel list in response to a second user input;
    searching the memory for pre-stored content based on broadcast service guide information that is associated with recorded or captured broadcast content pre-stored in the memory in response to a third user input for searching content related to a channel selected from the channel list;
    displaying a search result indicator indicating availability of the searched pre-stored content when the pre-stored content is identified by the searching;
    displaying a list of search results when the search result indicator is selected, the list of search results including at least one identified pre-stored content; and
    displaying pre-stored content selected from the list of search results by retrieving the selected content from the memory.

2. The method of claim 1, further comprising:
    creating a content that is a combination of the temporarily stored broadcast content and the extracted broadcast service guide information; and
    storing, in the memory, the created content.

3. The method of claim 1, wherein the broadcast service guide information comprises at least broadcast time information, a service identification (ID), a service name, a service number, a service description, a service type, channel information, a keyword, a theme, a genre, a synopsis, a content or program ID, a content start time, or a content end time.

4. The method of claim 1, wherein the memory comprises a web storage communicatively coupled to the mobile terminal.

5. The method of claim 1, wherein the extracted broadcast service guide information is stored as information linked to the stored broadcast content.

6. The method of claim 1, wherein the stored broadcast content and broadcast service guide information output in response to the selection of the stored broadcast content are displayed together on the display.

7. The method of claim 6, further comprising displaying an icon for reproducing the stored broadcast content when the stored broadcast content and broadcast service guide information are displayed together on the display.

8. The method of claim 7, wherein the icon is displayed overlaying the displayed broadcast content.

9. The method of claim 7, further comprising reproducing the stored broadcast content in response to an input received via the icon while the stored broadcast content and broadcast service guide information are displayed together on the display.

10. The method of claim 1, further comprising displaying a preview screen of the selected channel.

11. The method of claim 1, wherein the channel list includes a plurality of broadcast channels that are selectable.

12. The method of claim 11, wherein the channel list further includes a plurality of search icons, each of the plurality of search icons corresponding to a respective one of the plurality of channels.

13. The method of claim 12, wherein the third user input is received via one of the plurality of search icons.

14. The method of claim 1, wherein the search result indicator includes an icon indicating a number of the searched pre-stored content, the number corresponding to a number of the searched pre-stored content included in the displayed list of search results.

15. The method of claim 14, wherein the displayed list of search results includes a plurality of play icons, each of the plurality of play icons corresponding to a respective one of the searched pre-stored content included in the displayed list of search results.

16. The method of claim 15, further comprising reproducing the selected pre-stored content in response to an input received via one of the plurality of play icons.

17. The method of claim 1, wherein the list of search results is displayed on a popup window.

18. A mobile terminal comprising:
    a broadcast receiving module configured to receive broadcast content comprising broadcast data and broadcast service guide information;
    a memory configured to store the received broadcast content;
    a display unit configured to display real-time broadcast content currently provided via a broadcast channel; and
    a controller configured to:
        temporarily store, in a buffer, the broadcast content in response to a first user input for recording or capturing the displayed broadcast content;

extract broadcast service guide information associated with the displayed broadcast content from pre-stored broadcast service guide information;

store, in the memory, the temporarily stored broadcast content and the extracted broadcast service guide information;

output the stored broadcast content and broadcast service guide information associated with the stored broadcast content by retrieving the stored broadcast content and the broadcast service guide information associated with the stored broadcast content from the memory in response to selection of the stored broadcast content;

control the display unit to display a channel list in response to a second user input;

search the memory for pre-stored content based on broadcast service guide information that is associated with recorded or captured broadcast content pre-stored in the memory in response to a third user input for searching content related to a channel selected from the channel list;

control the display unit to display a search result indicator indicating availability of the searched pre-stored content when the pre-stored content is identified by the searching;

control the display unit to display a list of search results when the search result indicator is selected, the list of search results including at least one identified pre-stored content; and control the display unit to display pre-stored content selected from the list of search results by retrieving the selected content from the memory.

19. The mobile terminal of claim 18, wherein the broadcast service guide information comprises at least broadcast time information, a service identification (ID), a service name, a service number, a service description, a service type, channel information, a keyword, a theme, a genre, a synopsis, a content or program ID, a content start time, or a content end time.

20. The mobile terminal of claim 18, wherein the memory associated with the mobile terminal comprises a web storage communicatively coupled to the mobile terminal.

21. The mobile terminal of claim 18, wherein the extracted broadcast service guide information is stored as information linked to the stored broadcast content.

22. The mobile terminal of claim 18, wherein the stored broadcast content and broadcast service guide information output in response to the selection of the stored broadcast content are displayed together on the display unit.

23. The mobile terminal of claim 22, wherein the controller is further configured to control the display unit to display an icon for reproducing the stored broadcast content when the stored broadcast content and broadcast service guide information are displayed together on the display unit.

24. The mobile terminal of claim 23, wherein the icon is displayed overlaying the displayed broadcast content.

25. The mobile terminal of claim 23, wherein the controller is further configured to reproduce the stored broadcast content in response to an input received via the icon while the stored broadcast content and broadcast service guide information are displayed together on the display unit.

26. The mobile terminal of claim 18, wherein the controller is further configured to control the display unit to display a preview screen of the selected channel.

27. The mobile terminal of claim 18, wherein the channel list includes a plurality of broadcast channels that are selectable.

28. The mobile terminal of claim 27, wherein the channel list further includes a plurality of search icons, each of the plurality of search icons corresponding to a respective one of the plurality of channels.

29. The mobile terminal of claim 28, wherein the third user input is received via one of the plurality of search icons.

30. The mobile terminal of claim 18, wherein the search result indicator includes an icon indicating a number of the searched pre-stored content, the number corresponding to a number of the searched pre-stored content included in the displayed list of search results.

31. The mobile terminal of claim 30, wherein the displayed list of search results includes a plurality of play icons, each of the plurality of play icons corresponding to a respective one of the searched pre-stored content included in the displayed list of search results.

32. The mobile terminal of claim 31, wherein the controller is further configured to reproduce the selected pre-stored content in response to an input received via one of the plurality of play icons.

33. The mobile terminal of claim 18, wherein the list of search results is displayed on a popup window.

34. The mobile terminal of claim 18, wherein the controller is further configured to:

create a content that is a combination of the temporarily stored broadcast content and the extracted broadcast service guide information; and store the created content in the memory.

* * * * *